US012761986B2

(12) United States Patent
Gajera et al.

(10) Patent No.: US 12,761,986 B2
(45) Date of Patent: Oct. 13, 2026

(54) USER EVENT AND API INTERACTION RECORDING FOR ROBOTIC PROCESS AUTOMATION

(71) Applicant: Automation Anywhere, Inc., San Jose, CA (US)

(72) Inventors: Prakash M. Gajera, Fremont, CA (US); Jeckykumar Kansara, Vadodara (IN)

(73) Assignee: Automation Anywhere, Inc., San Jose, CA (US)

( * ) Notice: Subject to any disclaimer, the term of this patent is extended or adjusted under 35 U.S.C. 154(b) by 381 days.

(21) Appl. No.: 18/429,214

(22) Filed: Jan. 31, 2024

(65) Prior Publication Data

US 2025/0110810 A1 Apr. 3, 2025

Related U.S. Application Data

(60) Provisional application No. 63/541,870, filed on Oct. 1, 2023.

(51) Int. Cl.
*G06F 9/54* (2006.01)

(52) U.S. Cl.
CPC .............. *G06F 9/543* (2013.01); *G06F 9/542* (2013.01)

(58) Field of Classification Search
None
See application file for complete search history.

(56) References Cited

U.S. PATENT DOCUMENTS 7,716,632 B2 * 5/2010 Covely, III ......... G06F 11/3072 717/136
11,893,403 B1 * 2/2024 Gu ...................... G06F 9/45558
2010/0268521 A1 * 10/2010 Heller ................ G05B 23/0216 703/17
2015/0212927 A1 * 7/2015 N'Gum ................. G06F 11/368 717/125
2019/0342397 A1 * 11/2019 Laibson ................ H04L 67/131
2022/0032457 A1 * 2/2022 Anand ................... G06V 40/20
2022/0083330 A1 * 3/2022 Monakova .............. G06F 9/453
2022/0147386 A1 * 5/2022 Goyal ................... G06F 9/4881
2023/0185867 A1 * 6/2023 Dey ........................ G06F 9/547 709/217

(Continued)

FOREIGN PATENT DOCUMENTS

WO WO-2021076206 A1 * 4/2021 ........... G06N 3/0442

*Primary Examiner* — Charles E Anya
(74) *Attorney, Agent, or Firm* — Jason A. Smith; Shumaker, Loop & Kendrick, LLP

(57) ABSTRACT

Improved techniques and systems for creating software automation processes (e.g., software robots, bots) from recordings of interactions with application programs and network-accessible resources are disclosed. The recordings can be captured using a recorder, and the recorder can record not only user interactions with application programs but also Application Programming Interface (API) interactions with network accessible resources. From one or more of the recordings, a software automation process (e.g., software robot, bot) can be created, and the created software automation process can, when carried out, programmatically initiate (i) user interactions that mimic the user interactions that were recorded, and (ii) API interactions that mimic the API interactions that were recorded.

20 Claims, 13 Drawing Sheets

(56) References Cited

U.S. PATENT DOCUMENTS

| | | | | |
|---|---|---|---|---|
| 2023/0185869 | A1* | 6/2023 | S | G06F 16/951 715/205 |
| 2023/0281023 | A1* | 9/2023 | Bienfait | G06F 8/65 715/704 |
| 2024/0419433 | A1* | 12/2024 | Touati | G06F 8/65 |

* cited by examiner

USER EVENT AND API INTERACTION RECORDING FOR ROBOTIC PROCESS AUTOMATION

CROSS-REFERENCE TO RELATED APPLICATION

This application claims priority to U.S. Provisional Patent Application No. 63/541,870, filed Oct. 1, 2023, and entitled "USER EVENT AND API INTERACTION RECORDING FOR ROBOTIC PROCESS AUTOMATION," which is hereby incorporated by reference herein.

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human to perform various computer-based tasks. For instance, an RPA system can be used to interact with one or more software applications through user interfaces, as a human would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

RPA systems have generally assisted users in creating software robots that mimic user interactions with software applications to perform various tasks. However, the creation of software robots is not straight forward because sometimes the user interactions for a given task may cause use of an Application Programming Interface (API) to access remote resources (e.g., server-based resources). In doing so, a given API has certain parameters and/or authentication data that is needed in order to successfully interact with a particular server-based resource. While RPA systems may seek to automate such interactions by mimicking user interactions, conventionally when the user interactions cause interactions with APIs, RPA systems conventionally are unable to provide automation. The API has its own requirements, including for example authentications, that if not satisfied, can cause the API request to fail. As such, RPA systems have been unable to or hindered in creation of software robots that include interactions with APIs for access to server-based resources.

Therefore, there is a need for improved approaches to create software robots for RPA systems when the software robots interact with APIs.

SUMMARY

Improved techniques and systems for creating software automation process (e.g., software robots, bots) from recordings of interactions with application programs and network-accessible resources are disclosed. The recordings can be captured using a recorder, and the recorder can record not only user interactions with application programs but also API interactions with network-accessible resources. From one or more of the recordings, a software automation process (e.g., software robot, bot) can be created, and the created software automation process can, when carried out, programmatically initiate (i) user interactions that mimic the user interactions that were recorded, and (ii) API interactions that mimic the API interactions that were recorded.

The invention can be implemented in numerous ways, including as a method, system, device, or apparatus (including computer readable medium and graphical user interface). Several embodiments of the invention are discussed below.

As a method for creating a bot, one embodiment can, for example, include at least: initiating a recorder configured to capture a sequence of interactions with one or more application programs operating on at least one computing device and/or with one or more network-accessible resources operating on at least one remote computing device; recording, via the recorder, (i) user interactions with the one or more application programs operating on the at least one user computing device, and (ii) Application Programming Interface (API) interactions with the one or more network-accessible resources operating on at least one remote computing device; and creating the bot in accordance with the recording, the created bot including at least programmatic initiation of the user interactions and programmatic initiation of the API interactions.

As a computer-implemented method for creating a bot, one embodiment can, for example, include at least: initiating capture of user actions with one or more application programs operating on at least one user computing device; initiating capture of Application Programming Interface (API) actions with one or more network-accessible resources operating on at least one remote computing device; determining whether a user action with the one or more application programs has been detected; recording user information descriptive of the detected user action when the determining determines that the user action with the one or more application programs has been detected; determining whether an API call action with the one or more network-accessible resources has been detected; recording API call information descriptive of the detected API call action when the determining determines that the API call action with the one or more application programs has been detected; determining whether to stop the capture of the user actions and the API actions; ending the capture of user actions with the one or more application programs operating on the at least one user computing device after the determining determines that the capture of the user actions should stop; ending the capture of API actions with the one or more network-accessible resources operating on the at least one remote computing device after the determining determines that the capture of the API actions should stop; and creating the bot in accordance with the user information that has been recorded and the API call information that has been recorded, the created bot being configured to provide programmatic initiation of user actions to mimic the user actions that have been captured and to provide programmatic initiation of API actions to mimic the API call actions that have been captured.

As a non-transitory computer readable medium including at least computer program code tangible stored therein for creating a bot, one embodiment can, for example, include at least: computer program code for initiating a recorder configured to capture a sequence of interactions with one or more application programs operating on at least one computing device and/or with one or more network-accessible resources operating on at least one remote computing device; computer program code for recording, via the recorder, (i) user interactions with the one or more application programs operating on the at least one user computing device, and (ii) Application Programming Interface (API) interactions with the one or more network-accessible resources operating on at least one remote computing device; and computer program code for creating the bot in accordance with the recording, the created bot including at least programmatic initiation of the user interactions and programmatic initiation of the API interactions.

As a non-transitory computer readable medium including at least computer program code tangible stored therein for facilitating creation of a bot, one embodiment can, for example, include at least: computer program code for initiating capture of user actions with one or more application programs operating on at least one user computing device; computer program code for initiating capture of Application Programming Interface (API) actions with one or more network-accessible resources operating on at least one remote computing device; computer program code for determining whether a user action with the one or more application programs has been detected; computer program code for recording user information descriptive of the detected user action when the determining determines that the user action with the one or more application programs has been detected; computer program code for determining whether an API call action with the one or more network-accessible resources has been detected; computer program code for recording API call information descriptive of the detected API call action when the determining determines that the API call action with the one or more application programs has been detected; computer program code for determining whether to stop the capture of the user actions and the API actions; computer program code for ending the capture of user actions with the one or more application programs operating on the at least one user computing device after the determining determines that the capture of the user actions should stop; and computer program code for ending the capture of API actions with the one or more network-accessible resources operating on the at least one remote computing device after the determining determines that the capture of the API actions should stop.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Figure 1:
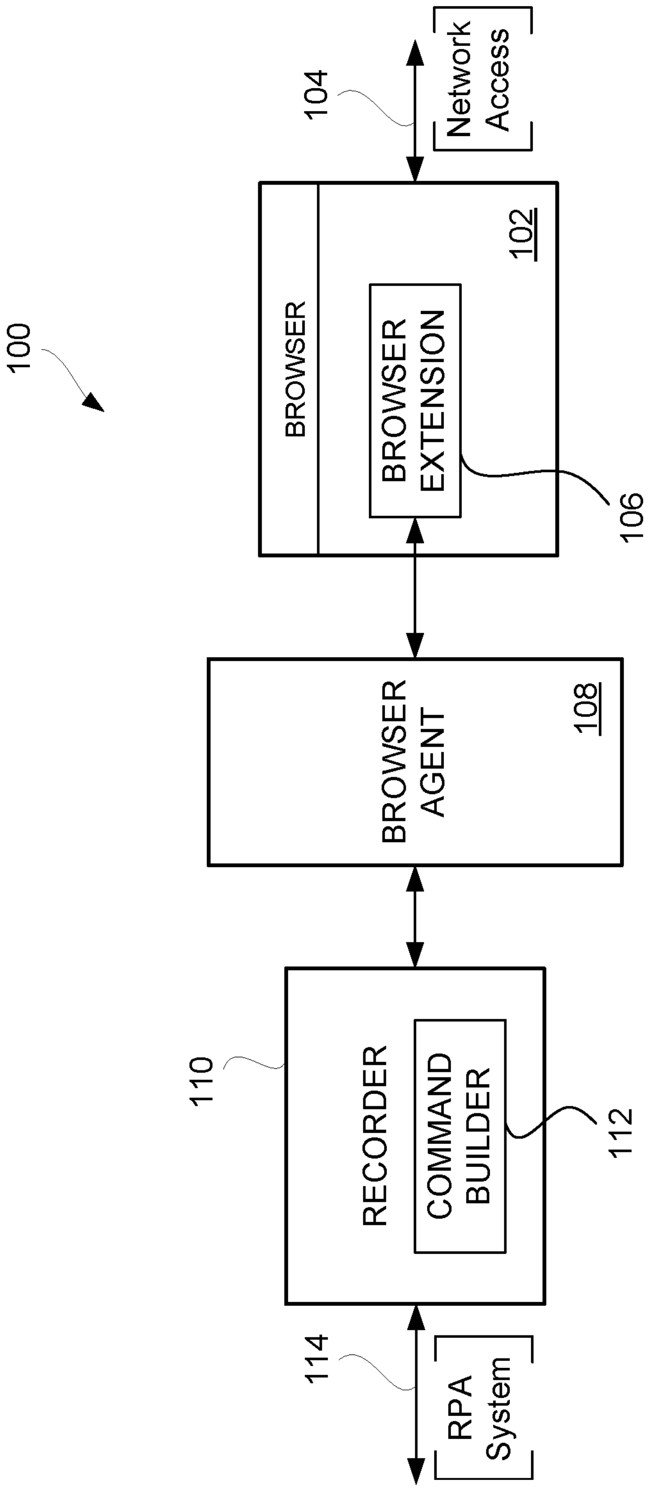
FIG. 1 is a block diagram of a bot creation system according to one embodiment.

Improved techniques and systems for creating software automation processes (e.g., software robots, bots) from recordings of interactions with application programs and network-accessible resources are disclosed. The recordings can be captured using a recorder, and the recorder can record not only user interactions with application programs but also API interactions with network-accessible resources. From one or more of the recordings, a software automation process (e.g., software robot, bot) can be created, and the created software robot can, when carried out, programmatically initiate (i) user interactions that mimic the user interactions that were recorded, and (ii) API interactions that mimic the API interactions that were recorded.

Generally speaking, RPA systems use computer software to emulate and integrate the actions of a human interacting within digital systems. In an enterprise environment, the RPA systems are often designed to execute a business process. In some cases, the RPA systems use artificial intelligence (AI) and/or other machine learning capabilities to handle high-volume, repeatable tasks that previously required humans to perform. The RPA systems also provide for creation, configuration, management, execution, and/or monitoring of software automation processes.

A software automation process can also be referred to as a software robot, software agent, automation program or bot. A software automation process can interpret and execute tasks on one's behalf. In doing so, sometimes the software automation process operates to access one or more remote resources via a network. In one embodiment, the remote resource are network accessible resources. The network accessible resources are, for example, an authentication server, a web server, a remote database, or a cloud-based storage.

Software automation processes are particularly well suited for handling a lot of the repetitive tasks that humans perform every day. Software automation processes can accurately perform a task or workflow they are tasked with over and over. As one example, a software automation process can locate and read data in a document, email, file, or window. As another example, a software automation process can connect with one or more Enterprise Resource Planning (ERP), Customer Relations Management (CRM), core banking, and other business systems to distribute data where it needs to be in whatever format is necessary. As another example, a software automation process can perform data tasks, such as reformatting, extracting, balancing, error checking, moving, copying, or any other desired tasks. As another example, a software automation process can grab data desired from a webpage, application, screen, file, or other data source. As still another example, a software automation process can be triggered based on time or an event, and can serve to take files or data sets and move them to another location, whether it is to a customer, vendor, application, department or storage. These various capabilities can also be used in any combination. As an example of an integrated software automation process making use of various capabilities, the software automation process could start a task or workflow based on a trigger, such as a file being uploaded to an FTP system. The integrated software automation process could then download that file, scrape relevant data from it, upload the relevant data to a database, and then send an email to a recipient to inform the recipient that the data has been successfully processed.

Embodiments of various aspects of the invention are discussed below with reference to FIGS. 1-12. However, those skilled in the art will readily appreciate that the detailed description given herein with respect to these figures is for explanatory purposes as the invention extends beyond these limited embodiments.

FIG. 1 is a block diagram of a bot creation system 100 according to one embodiment. The bot creation system 100 is part of, supports or in communication with an RPA system. In one implementation, the bot creation system 100 can be referred to as a bot creation sub-system of or for an RPA system.

The bot creation system 100 interacts with a browser 102 that couples to a network 104 to gain access to one or more network-accessible resources. The bot creation system 100 can include a browser extension 106. The browser extension 106 is provided within or in communication with the browser 102. The browser extension 106 monitors the browser 102 and captures user actions and/or API actions that occurred during operation of the browser 102. For example, the browser extension 106 can be registered with the browser 102 to intercept (i) user interactions with the browser 102 and/or (ii) web requests (e.g., API requests).

The bot creation system 100 can also include browser agent 108. The browser agent 108 receives the user actions and/or API actions from the browser extension 106. For example, the user extensions and/or the web requests that have been intercepted by the browser extension 106 can be provided to the browser agent 108.

The bot creation system 100 can also include a recorder 110. The recorder 110 interacts with the browser agent 108 so as to receive the various user actions and/or API actions that were captured by the browser extension 106. In other words, the browser agent 108 communicates between the browser extension 106 and the recorder 110, such as forwarding the user actions (e.g., user inputs) and/or the web requests (e.g., API actions) that have intercepted by the browser extension 106 to the recorder 110. In doing so, the browser agent provides descriptive information of the user actions and/or the web requests to the recorder 110. Besides forwarding the user actions and/or the web requests, in another embodiment, the browser agent 108 can also provide processing of the user actions and/or the web requests for operations such as formatting, filtering, storing, etc.

The recorder 110 can record the series of incoming user actions and/or web requests as recorded data. The recorder 110 can also include a command builder 112 that can convert the recorded data to a particular RPA system format. Different RPA systems use different command formats, such as when creating a bot to carry out the recording. Hence, the command builder 112 can convert the recorded data to a command format associated with the particular RPA system format. In one embodiment, the converted recorded data has a JSON format. The converted recorded data can then be provided to the associated RPA system via a connection 114. The connection 114 can be a wired or wireless connection, as examples.

In one embodiment, the command builder 112 can also modify a recording gathered by the recorder 110 such that the recording includes variables, which can be identified and accessed by a bot that is created to carry out the interactions associated with the recording. The command builder 112 can produce variablized, recorded data, such as by replacing certain fixed data values in the converted recorded data with variables. The variablized, recorded data can then be provided to the associated RPA system via the connection 114. Here, the variablization operates to make a fixed value into a variable. This can allow a bot to be created that can dynamically assign values to the variables at run time, which can make the bot more sophisticated in its operation and better able to initiate API requests dynamically.

The bot creation system 100 provides the converted recording data (which may also be variablized) that is suitably formatted for usage by the RPA system to an RPA system for creation of a bot. The creation of the bot is typically performed by the RPA system.

Figure 2:
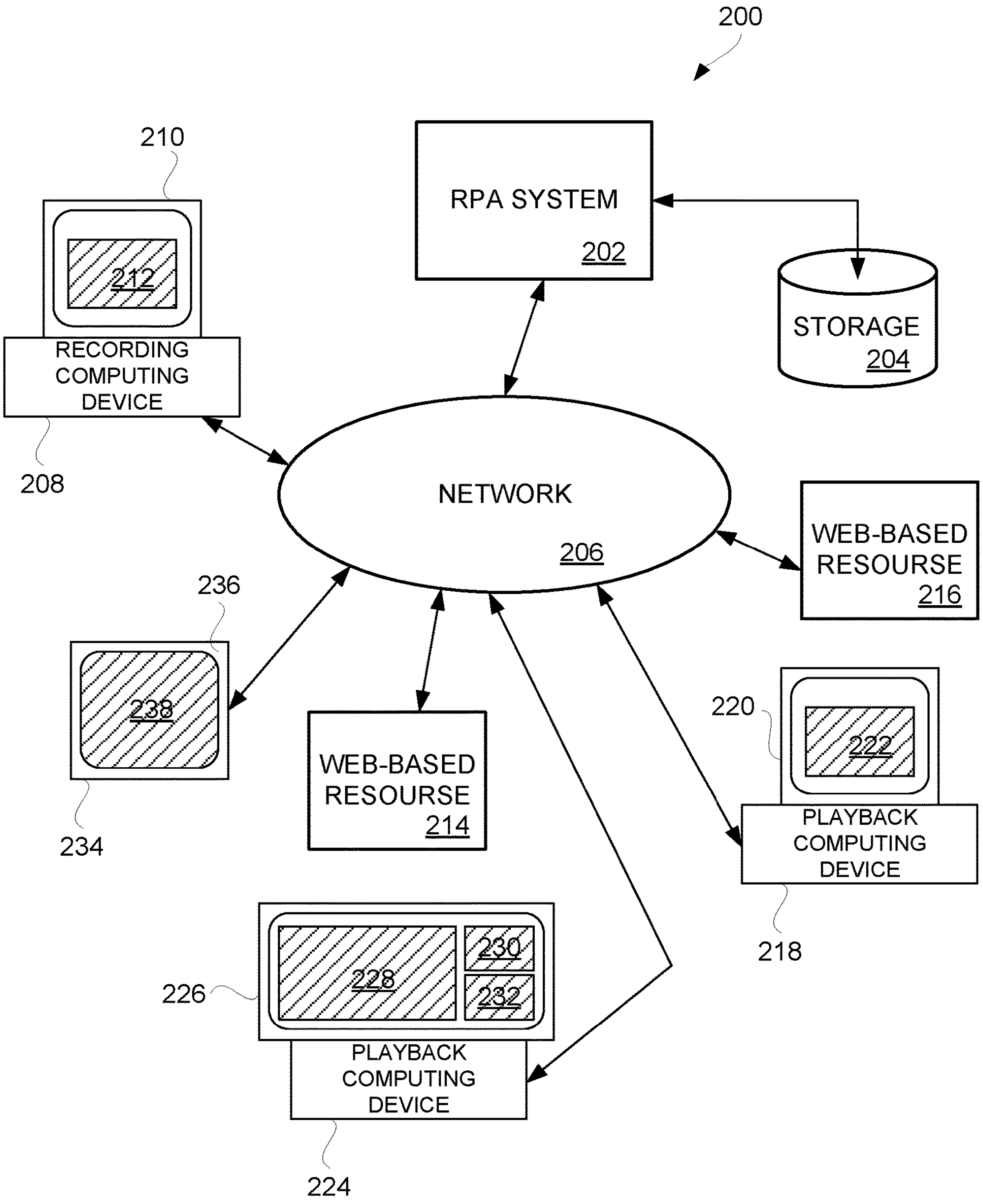
FIG. 2 is a block diagram of a computing environment according to one embodiment.

FIG. 2 is a block diagram of a computing environment 200 according to one embodiment. The computing environment 200 includes an RPA system 202. The RPA system 202 is, for example, similar to the RPA system illustrated in FIG. 1. The RPA system 202 can be coupled to a storage 204 for storage of software automation processes (e.g., bots). The computing environment 200 can also include or be coupled to a network 206 made up of one or more wired or wireless networks that serve to electronically interconnect various computing devices for data transfer.

In general, the computing environment 200 can support various different types of computing devices that can interact with the RPA system 202. These computing devices can serve as a recording computing device, a playback computing device, or both.

As shown in FIG. 2, the computing environment 200 can include a recording computing device 208 that includes a display device 210 and a window 212 presented on the display device 210. The window 212 can, in one example, depict a user interface that is associated with recording user interactions with one or more application programs to produce a software automation process using the RPA system 202.

The recording computing device 208 can include at least a portion of a bot creation sub-system, such as the bot creation system 100 illustrated in FIG. 1. With the bot creation sub-system, the recording computing device 208 can operate a recorder (e.g., recorder 110) to record user actions as well as API actions during a recording process. The computing environment 200, such as the RPA system 202, can then use the one or more recordings to generate a software automation process (e.g., bot) that mimics the associated user action and API actions of the one or more recordings.

The recording of API actions can operate to record interactions with various web-based resources that are accessible via the network 206, such as web-resources 214 and 216 illustrated in FIG. 2. In general, the web-based resources can provide web-based services. The web-based resources can, for example, pertain to an authentication server, a web server, a remote database, or cloud-based storage.

The computing environment 200 shown in FIG. 2 can also include various playback computing devices. A first playback computing device 218 includes a display device 220 that can present a window 222. A second playback computing device 224 includes a display device 226 that can present a first window 228, a second window 230 and a third window 232. A third playback computing device 234 includes a display device 236 that can present a window 238. More generally, the windows are screens that are presented and visible on respective display devices as graphical user interfaces. Of course, the recording computing device 208 can also operate as a playback computing device.

The different playback computing devices 218, 224 and 234 can be configured to execute software automation processes that were previously created. When one of the playback computing devices 218, 224 and 234 executes a software automation process (e.g., bot) that has been created from one or more recordings, the playback computing device may not only mimic user interactions with application programs on or accessible to the playback computing device, but may also send one or more API requests to the web-based resources 214, 216 and receive one or more responses to the API requests.

Figure 3:
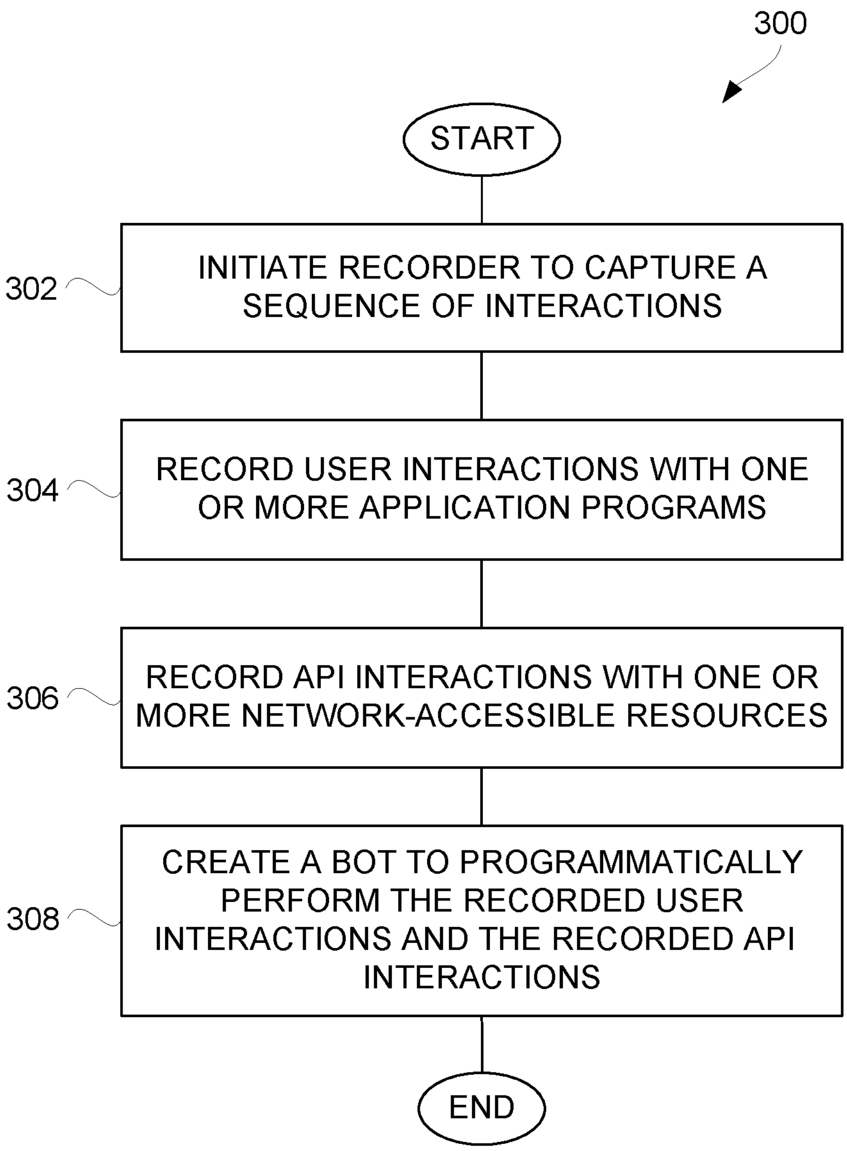
FIG. 3 is a flow diagram of a bot creation process according to one embodiment.

FIG. 3 is a flow diagram of a bot creation process 300 according to one embodiment. A recording associated with a task to be carried out using one or more application programs can be captured, and then a bot can be created from the recording to provide an automated implementation of the task using the one or more application programs. The bot can programmatically mimic actions of a user.

The bot creation process 300 can initiate 302 a recorder to capture a sequence of interactions. After the recorder has been initiated 302, the recorder can record 304 user interactions with one or more application programs. For example, if a user interacts with a graphical user interface of a particular one of the one or more application programs, such as by a control section (e.g., mouse clicks) and/or by entering data with respect to a data entry object (e.g., text entry box), the user interactions can be recorded 304. In addition, after the recorder has been initiated 302, the recorder can also record 306 API interactions with one or more network-accessible resources. One example of a network-accessible resource is a remote server, such as a web server. Other examples of network-accessible resources can include databases, storage device, or web services, which can be referred to as remote or web-based resources that are accessible via one or more networks.

After the user interactions have been recorded 304 and the API interactions have been recorded 306, a bot can be created 308. The created bot, when executed (e.g., run), operates to programmatically perform the recorded user interactions and the recorded API interactions. That is, the created bot can provide automated processing for any interactions that would have otherwise needed to be provided by a user in order to carry out the task(s), including interaction with network-accessible resources. After the bot has been created 308, the bot creation process 300 can end.

Figure 4:
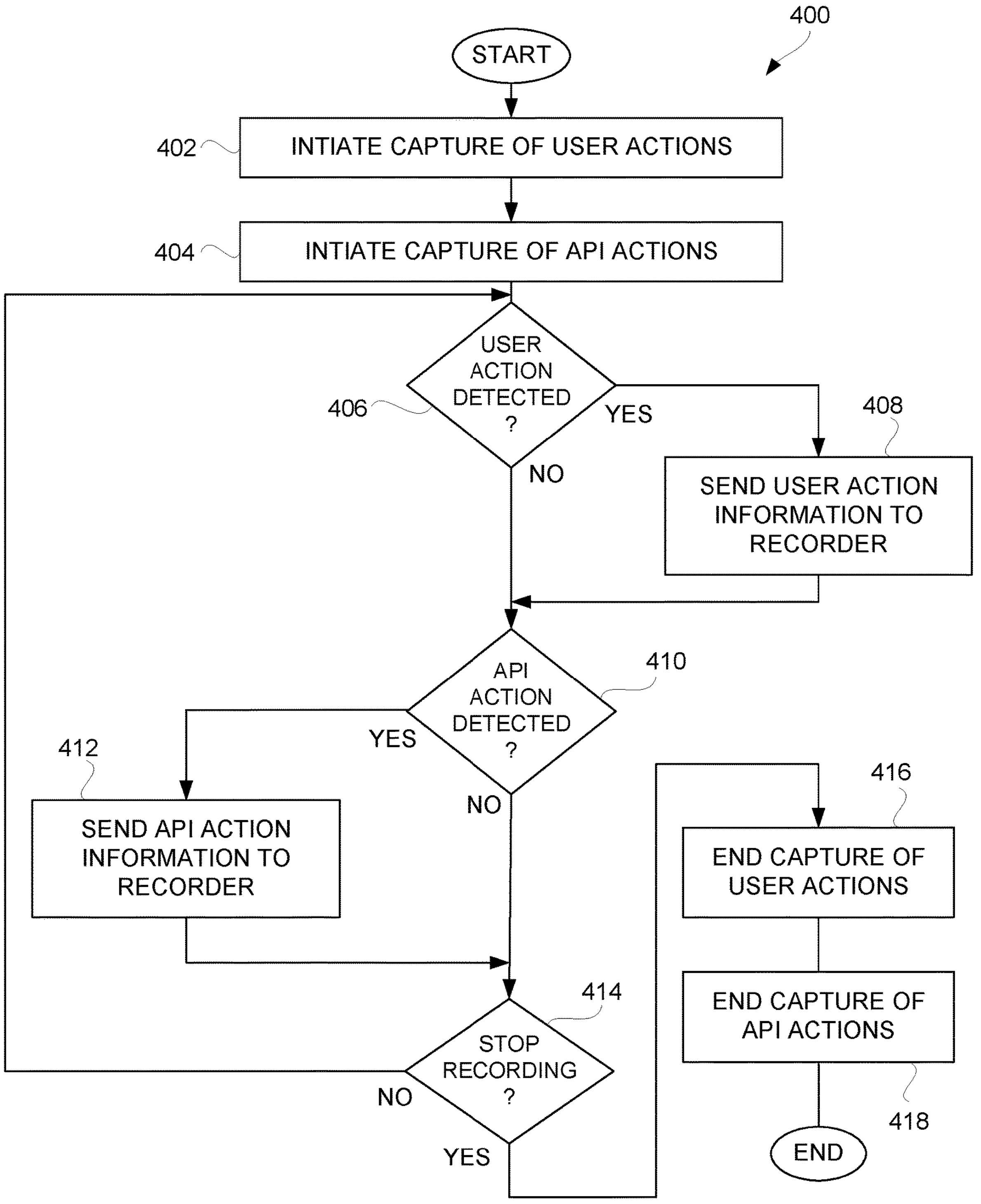
FIG. 4 is a flow diagram of an enhanced recording process according to one embodiment.

FIG. 4 is a flow diagram of an enhanced recording process 400 according to one embodiment. The enhanced recording process 400 can, for example, be performed by a RPA system, such as a bot creation sub-system of or for an RPA system. The bot creation system 100 illustrated FIG. 1 is one example of a suitable bot creation sub-system for carrying out the enhanced recording process 400.

The enhanced recording process 400 can initiate 402 capture of user actions. In addition, the enhanced recording process 400 can also initiate 404 capture of API actions. After the capture of user actions and/or API actions have been initiated 402, 404, a decision 406 can determine whether a user action has been detected. When the decision 406 determines that a user action has been detected, user action information pertaining to the detected user action can be sent 408 to a recorder. The recorder is typically utilized by an RPA system to record the actions and events previously performed or initiated by a user so that a bot can be created for future automation of the actions previously performed or initiated by the user. As an example, the recorder can be the recorder 110 illustrated in FIG. 1.

Following block 408, or following the decision 406 when the user action has not been detected, a decision 410 can determine whether an API action (e.g., API call) has been detected. When the decision 410 determines that an API action has been detected, API action information (e.g., API call information) can be sent 412 to the recorder.

Following block 412, or following the decision 410 when an API action has not been detected, a decision 414 can determine whether the recording of user actions and/or API actions should stop. When the decision 414 determines that the recording should not stop, then the processing performed by the enhanced recording process 400 can return to repeat the decision 406 and subsequent blocks so that other user actions and/or API actions can be detected and recorded. Alternatively, when the decision 414 determines that the recording of the user actions and/or API actions should stop, then capture of user actions can end 416 and capture of API actions can end 418. Following the block 418, the enhanced recording process 400 can end.

Figure 5:
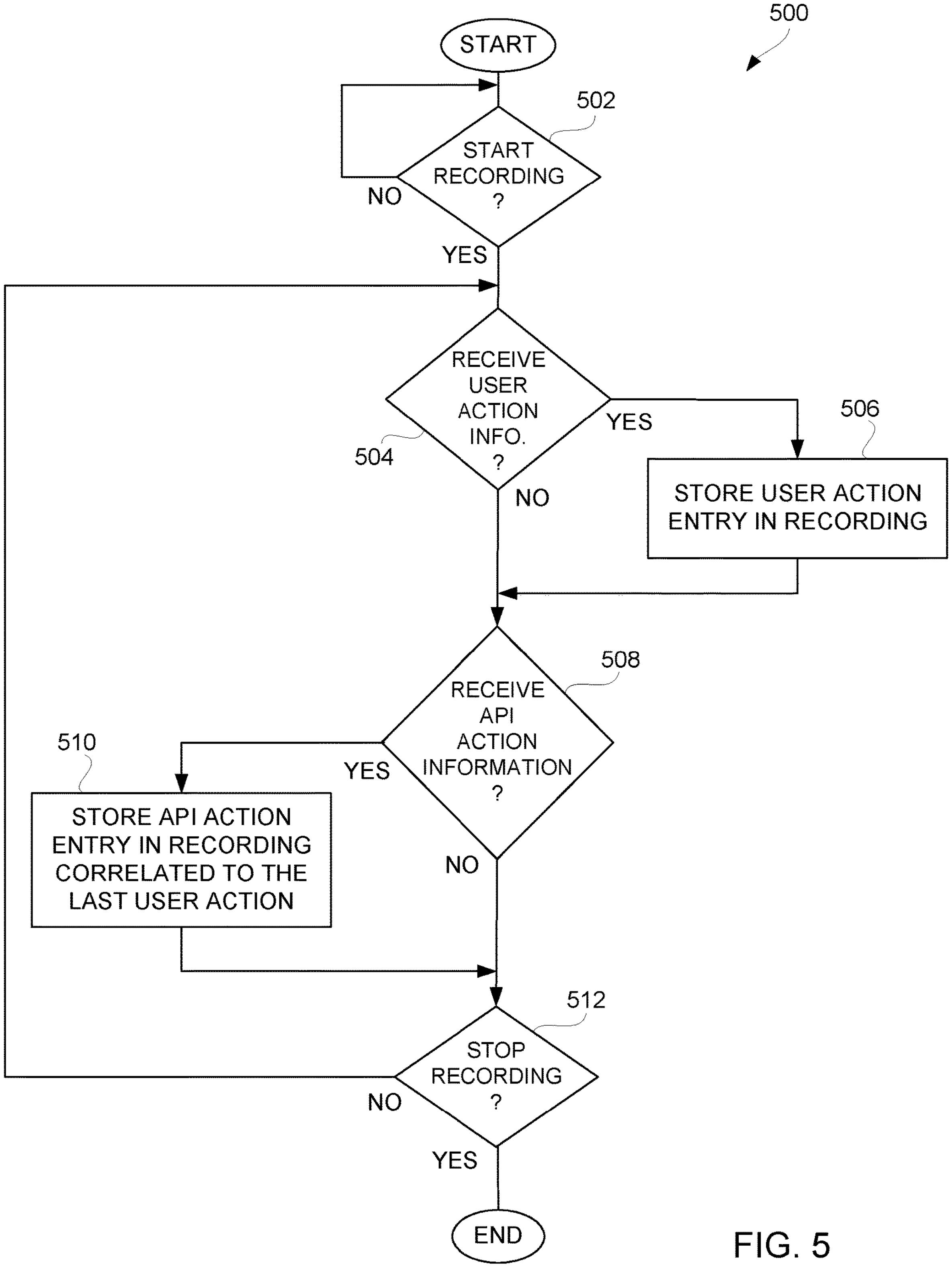
FIG. 5 is a flow diagram of a recording formation process according to one embodiment.

FIG. 5 is a flow diagram of a recording formation process 500 according to one embodiment. The recording formation process 500 is, for example, performed by a recorder, such as the recorder 110 illustrated in FIG. 1.

The recording formation process 500 can begin with a decision 502 that determines whether a recording should be started. When the decision 502 determines that a recording has not yet been started, the recording formation process 500 awaits an instruction to begin recording. On the other hand, when the decision 502 determines that a recording should be started, the recording formation process 500 can start a recording and continue with the recording formation process 500.

Once a recording has been started, a decision 504 can determine whether user action information has been received. For example, the recorder can receive user action information from a browser agent, such as the browser agent 108 illustrated in FIG. 1. When the decision 504 determines that user action information has been received, a user action entry can be stored 506 in the recording that has been started.

Following the storage 506 of the user action entry, or following the decision 504 when user action information has not been received, a decision 508 can determine whether API action information has been received. For example, the recorder can receive API action information from a browser agent, such as the browser agent 108 illustrated in FIG. 1. When the decision 508 determines that API action information has been received, an API action entry can be stored 510 in the recording such that the API action entry is associated with or corresponds to the latest user action.

Following the storage 510 of the API action entry, or following the decision 508 when API action information has not been received, a decision 512 can determine whether the recording should end. When the decision 512 determines that the recording should not end, then the recording formation process 500 can return to repeat the decision 504 and subsequent blocks so that subsequently received user action information and/or API action information can be similarly processed and appropriate entries can be added to the recording. Alternatively, when the decision 512 determines that the recording should end, then the recording formation process 500 can end. When the recording formation process 500 ends, the recording that has been started, and for which various user action entries and/or API action entries have been entered, can be closed, thereby ending the recording.

Figure 6:
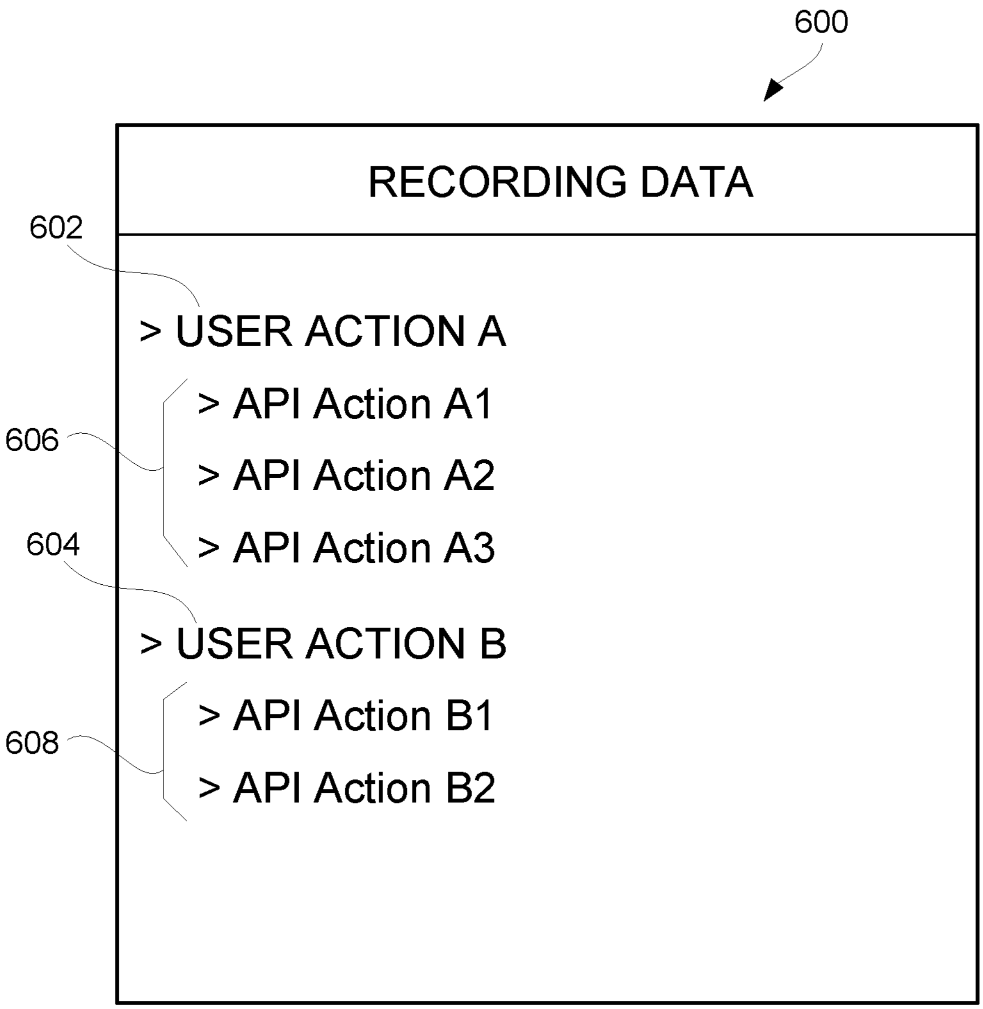
FIG. 6 illustrates exemplary recording data according to one embodiment.

FIG. 6 illustrates exemplary recording data 600 according to one embodiment. The exemplary recording data 600 is, for example, storage of user action information and API action information, such that the API action information is stored in a manner that associates API actions to corresponding user actions. For example, the exemplary recording data 600 being stored as shown in FIG. 6 can represent the user action entries and the API action entries being stored 506, 510 by the recording formation process 500 shown in FIG. 5.

As shown in FIG. 6, the exemplary recording data 500 can include a User Action A 602 and a User Action B 604. The exemplary recording data 600 as stored can include a first set of API Actions 606 stored in association with the User Action A 602. The first set of API actions 606 can include API Action A1, API Action A2 and API Action A3. The first set of API actions 606 are those API actions that occurred after the detection of the User Action A 602 and before the detection of the User Action B 604. Hence, the API Action A1, API Action A2 and API Action A3 within the first set of API Actions 606 are correlated to the User Action A 602. Similarly, the exemplary recording data 600 as stored can include a second set of API Actions 608 stored in association with the User Action B 604. The second set of API Actions 608 can include API Action B1 and API Action B2. The second set of API actions 608 are those API actions that occurred after the detection of the User Action B 604 and before the detection of a subsequent user action (not shown). Hence, the API Action B1 and API Action B2 within the second set of API Actions 608 are correlated to the User Action B 604.

Figure 7A:
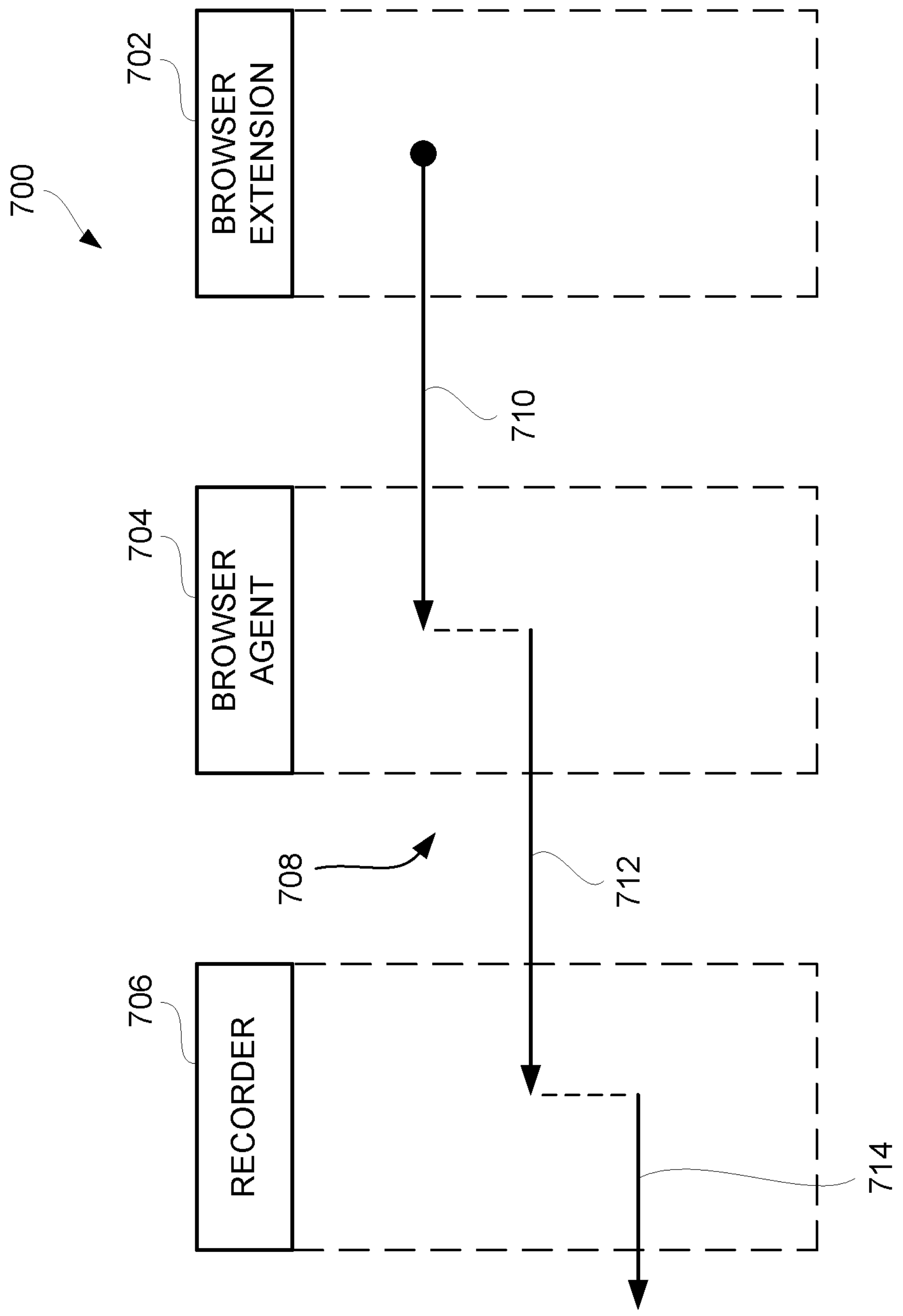
FIG. 7A is a data flow diagram illustrating generation and exchange of data files by a bot creation system for user actions, according to one embodiment.

FIG. 7A is a data flow diagram 700 illustrating generation and exchange of data files by a bot creation system for user actions, according to one embodiment. The bot creation system shown in FIG. 7A is simplified and includes three components, a browser extension 702, a browser agent 704 and a recorder 706. In one implementation, the bot creation system can pertain to the bot creation system 100, and the browser extension 702, browser agent 704 and the recorder 706 can pertain to the browser extension 106, the browser agent 108 and the recorder 110, respectively, as illustrated in FIG. 1.

The data flow diagram 700 illustrated in FIG. 7A indicates a user action data flow 708 that follows from a user action detected at the browser extension 702. The detected user action occurs at a browser by a user action (e.g., mouse click or text entry). The browser extension 702 is coupled to the browser to provide for capture of such user actions from the browser. A Step Response 710 for the detected user action is provided from the browser extension 702 to the browser agent 704. The Step Response 710 is a data file that is descriptive of the user action that occurred with respect to the browser.

After receiving the Step Response 710 at the browser agent 704, the browser agent 704 forwards a forwarded Step Response 712 to the recorder 706. The forwarded step response 712 may be the same as the Step Response 710 or it may be a modified version of the Step Response 710. In other words, optionally, the browser agent 704 can modify the Step Response 710, such as its format, arrangement or its content, prior to forwarding the forwarded Step Response 712 to the recorder 706.

After the forwarded Step Response 712, whether modified or not, has been received at the recorder 706, the recorder 706 can operate to convert the forwarded Step Response 712 into a converted Step Response 714 and then stored. The recorder 706 can also provide the converted Step Response 714 to a RPS system. In one implementation, the recorder 706 can convert the forwarded Step Response 712 to a format and/or arrangement that is understood by the RPA system that utilizes the converted Step Response 714 when creating a bot that is configured to carry out the user action in an automated fashion by "running" the created bot. Although the user action data flow 708 can pertain to automation of a single user action, the same or similar data flow can be provided for one or more other user actions, and thus can be automated in a similar manner, often in a bot that automates numerous user actions.

An exemplary Step Response (e.g., Step Response 710 or forwarded Step Response 712) following a user action involving a user selecting a button labeled "New" on a user interface (e.g., page) rendered by a browser, is a data file as follows.

Exemplary Step Response

```
{
  "stepResponse": {
    "type": "API_RECORDER_ELEMENT_INNER_TEXT",
    "title": "New"
  }
}
```

An exemplary converted Step Response (e.g., converted Step Response 714) following conversion of the exemplary Step Response, such as for use by a particular RPA system, is a data file as follows.

Exemplary Converted Step Response

```
{
  "attributes": [
    {
      "name": "title",
      "value": {
        "string": "New"
      }
    }
  ]
}
```

Figure 7B:
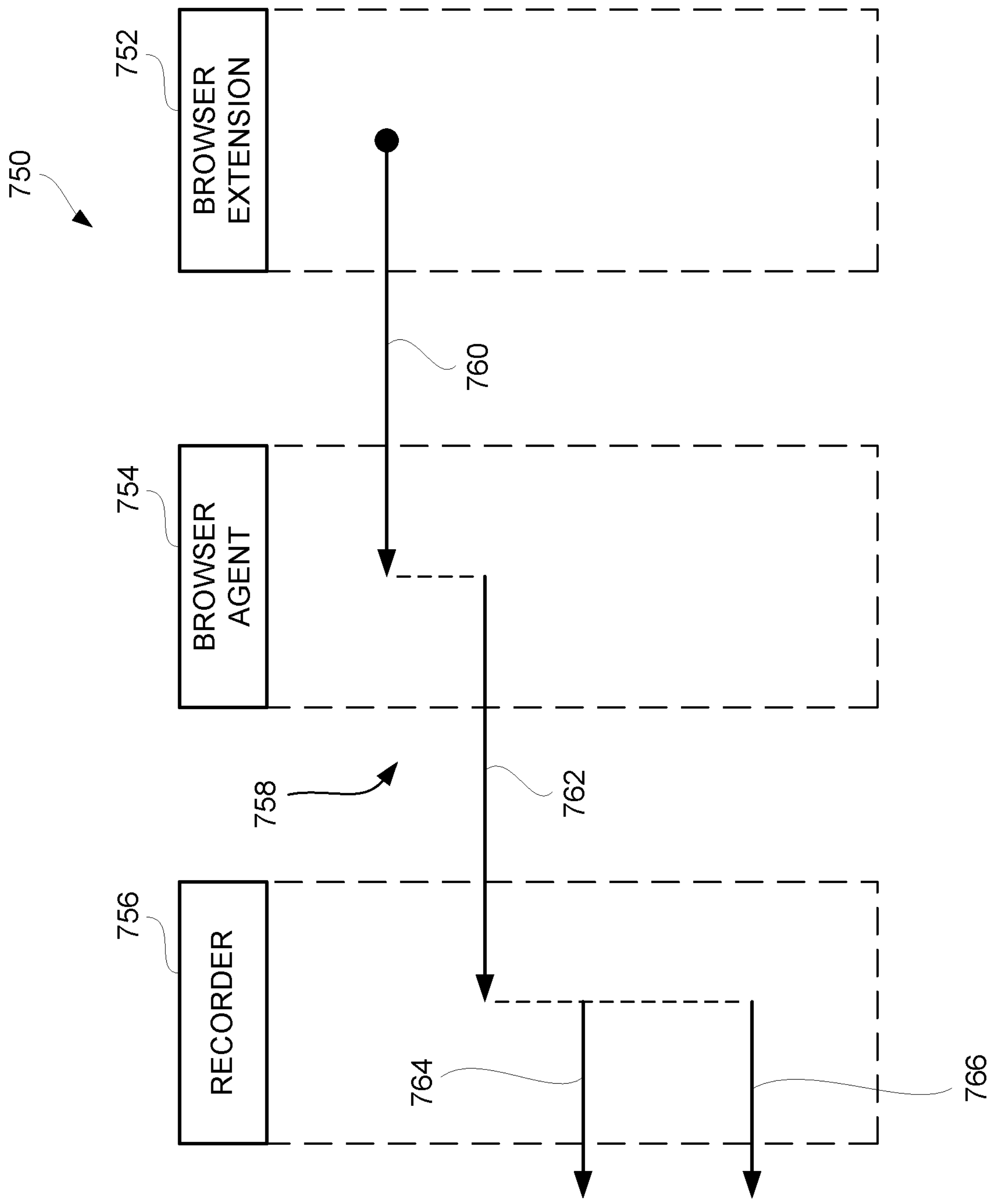
FIG. 7B is a data flow diagram illustrating generation and exchange of data files by a bot creation system for API actions, according to one embodiment.

FIG. 7B is a data flow diagram 750 illustrating generation and exchange of data files by a bot creation system for API actions, according to one embodiment. The bot creation system shown in FIG. 7B is simplified and includes three components, a browser extension 752, a browser agent 754 and a recorder 756. In one implementation, the bot creation system can pertain to the bot creation system 100, and the browser extension 702, browser agent 704 and the recorder 706 can pertain to the browser extension 106, the browser agent 108 and the recorder 110, respectively, as illustrated in FIG. 1. Also, in one implementation, the browser extension 752, browser agent 754 and the recorder 756 can respectively be combined or integrated together with the browser extension 702, browser agent 704 and the recorder 706, as illustrated in FIG. 7A so as to handle both user action and API actions.

The data flow diagram 750 illustrated in FIG. 7B indicates an API action data flow 758 that follows from an API action detected at the browser extension 752. The detected API action occurs at a browser by an API action (e.g., API post request). Typically, the API action will follow from a user action, and in such cases the API action can be associated with the initiating user action. The browser extension 752 is coupled to the browser to provide for capture of such API actions from the browser. An API Response 760 for the detected API action is provided from the browser extension 752 to the browser agent 754. The API Response 760 is a data file that is descriptive of the API action that occurred with respect to the browser.

After receiving the API Response 760 at the browser agent 754, the browser agent 754 forwards a forwarded API Response 762 to the recorder 756. The forwarded API response 762 may be the same as the API Response 760 or it may be a modified version of the API Response 760. In other words, optionally, the browser agent 754 can modify the API Response 760, such as its format, arrangement or its content, prior to forwarding the forwarded API Response 762 to the recorder 756.

After the forwarded API Response 762, whether modified or not, has been received at the recorder 756, the recorder 756 can operate to convert the forwarded API Response 762 into a converted API Response 764 and then stored. The recorder 756 can also provide the converted API Response 764 to a RPS system. In one implementation, the recorder 756 can convert the forwarded API Response 762 to a format and/or arrangement that is understood by the RPA system that utilizes the converted API Response 764 when creating a bot that is configured to initiate the API action in an automated fashion by "running" the created bot. Although the API action data flow 758 can pertain to automation of a single API action, the same or similar data flow can be provided for one or more other API actions, and thus can be automated in a similar manner, often in a bot that automates numerous API actions.

Additionally, the converted API Response 764 can be further modified by the recorder 756. The modification being perform can be to variablize the converted API Response 764 to provide a variablized API response 766. For example, the recorder 756 can include a command builder to perform processing to variablize the converted API Response 764. Here, fixed input values for input parameters of an API can be replaced with variables. By doing so, a resulting bot can be created such that needed parameters for an associated API action can be provided dynamically via the variables in the variablized API response 766.

An exemplary API Response (e.g., API Response 760 or forwarded API Response 762) that is to be initiated following a user action, such as a user selecting a button labeled "New" on a user interface (e.g., page) rendered by a browser, is a data file as follows.

Exemplary API Response

```
{
  "apiResponse": {
    "requestId": "11864.7141",
    "method": "POST",
    "url": "https://ap16.lightning.force.com/aura?r=124&ui-
force-components-controllers-
createRecordTypeChecker.CreateRecordTypeChecker.doRecordTypeCheck=1",
    "authentication": "NoAuthentication",
    "contentType": {
      "type": "APPLICATION_FORM"
    },
    "headers": [
      {
        "name": "Referer",
        "value":
"https://ap16.lightning.force.com/lightning/o/Account/new?count=8&noov
erride=1&useRecordTypeCheck=1&navigationLocation=LIST_VIEW&uid=1678096
98850161428&backgroundContext=%2Flightning%2Fo%2FAccount%2Flist%3Ffilt
erName%3DRecent"
      },
      {
        "name": "User-Agent",
        "value": "Mozilla/5.0 (Windows NT 10.0; Win64;
x64) AppleWebKit/537.36 (KHTML, like Gecko) Chrome/110.0.0.0
Safari/537.36"
      },
      {
        "name": "X-SFDC-Page-Cache",
        "value": "cb892dc786013871"
      },
      {
        "name": "X-SFDC-Request-Id",
        "value": "5040741500000e0ee5"
      },
      {
        "name": "sec-ch-ua",
        "value": "\"Chromium\";v=\"110\", \"Not
A(Brand\";v=\"24\", \"Google Chrome\";v=\"110\""
      },
      {
        "name": "sec-ch-ua-mobile",
        "value": "?0"
      },
      {
```

-continued

```
            “name”: “sec-ch-ua-platform”,
            “value”: “\“Windows\””
        }
    ],
    “body”:
“\“message=%7B%22actions%22%3A%5B%7B%22id%22%3A%223172%3Ba%22%2C%22des
criptor%22%3A%22serviceComponent%3A%2F%2Fui.force.components.controlle
rs.createRecordTypeChecker.CreateRecordTypeCheckerController%2FACTION%
24doRecordTypeCheck%22%2C%22callingDescriptor%22%3A%22UNKNOWN%22%2C%22
params%22%3A%7B%22entityApiName%22%3A%22Account%22%2C%22defaultFieldVa
lues%22%3Anull%2C%22navigationLocation%22%3A%22LIST__VIEW%22%2C%22navig
ationLocationId%22%3A%22Recent%22%2C%22removeAnimations%22%3Afalse%2C%
22createRecordPanelTitle%22%3Anull%7D%2C%22storable%22%3Atrue%7D%5D%7D
&aura.context=%7B%22mode%22%3A%22PROD%22%2C%22fwuid%22%3A%22D7zdsGvlxZ
fFP0e3F1H__2A%22%2C%22app%22%3A%22one%3Aone%22%2C%22loaded%22%3A%7B%22A
PPLICATION%40markup%3A%2F%2Fone%3Aone%22%3A%22QxH92NrKwFUqnsrKf8TjmQ%2
2%7D%2C%22dn%22%3A%5B%5D%2C%22globals%22%3A%7B%22density%22%3A%22VIEW__
TWO%22%2C%22appContextId%22%3A%2206m2w00000524wSAAQ%22%7D%2C%22uad%22%
3Atrue%7D&aura.pageURI=%2Flightning&2Fo%2FAccount%2Fnew%3Fcount%3D8%26
nooverride%3D1%26useRecordTypeCheck%3D1%26navigationLocation%3DLIST__VI
EW%26uid%3D16780969885016 1428%26backgroundContext%3D%252Flightning%252
Fo%252FAccount%252Flist%253FfilterName%253DRecent&aura.token=eyJub25jZ
SI6IkVVRGFvcFVmRXlVYU9zdmctQzFwSEFDajZaQ2M2ME1tTGNQSGVoa2VYZVlcdTAwM2Q
iLCJ0eXAiOiJKV1QiLCJhbGciOiJIUzI1NiIsImtpZCI6IntcInRcIjpcIjAwRDJ3MDAwM
DAwQ21VNlwiLFwidlwiOlwiMDJHMncwMDAwMDAwWXFYXCIsXCJhXCI6XCJjYWltYW5zaWd
uZXJcIn0iLCJjcml0IjpbImlhdCJdLCJpYXQiOjE2NzgwOTE5NDgxNzcsImV4cCI6MH0%3
D..xYMShbI__49V127bOk7ZVFkRq8wE__LpepEJDkk6npI4w%3D\””
  }
}
```

An exemplary converted API Response (e.g., converted API Response 764) following conversion of the exemplary API Response, such as for use by a particular RPA system, is a data file as follows.

Exemplary Converted API Response

```
{
  “uid”: “11864.7141”,
  “packageName”: “Rest”,
  “commandName”: “restPost”,
  “attributes”: [
    {
      “name”: “uriOption”,
      “value”: {
        “string”: “text”
      }
    },
    {
      “name”: “uri”,
      “value”: {
        “string”:
“https: //ap16.lightning.force.com/aura?r=124&ui-force-components-
controllers-
createRecordTypeChecker.CreateRecordTypeChecker.doRecordTypeCheck=1”
      }
    },
    {
      “name”: “proxyType”,
      “value”: {
        “string”: “SYSTEM”
      }
    },
    {
      “name”: “authenticationMode”,
      “value”: {
        “string”: “NoAuthentication”
      }
    },
    {
      “name”: “allowInsecureConnection”,
      “value”: {
        “type”: “BOOLEAN”,
        “boolean”: “false”
      }
```

-continued

```
      },
      {
        "name": "timeOut",
        "value": {
          "type": "NUMBER",
          "number": "60000"
        }
      },
      {
        "name": "headerContentType",
        "value": {
          "string": "application/x-www-form-urlencoded"
        }
      },
      {
        "name": "allowInsecureConnection",
        "value": {
          "type": "BOOLEAN",
          "boolean": "false"
        }
      },
      {
        "name": "parameterOption",
        "value": {
          "string": "text"
        }
      },
      {
        "name": "customContentTypeBody",
        "value": {
          "string":
"\"message=%7B%22actions%22%3A%5B%7B%22id%22%3A%223172%3Ba%22%2C%22des
criptor%22%3A%22serviceComponent%3A%2F%2Fui.force.components.controlle
rs.createRecordTypeChecker.CreateRecordTypeCheckerController%2FACTION%
24doRecordTypeCheck%22%2C%22callingDescriptor%22%3A%22UNKNOWN%22%2C%22
params%22%3A%7B%22entityApiName%22%3A%22Account%22%2C%22defaultFieldVa
lues%22%3Anull%2C%22navigationLocation%22%3A%22LIST__VIEW%22%2C%22navig
ationLocationId%22%3A%22Recent%22%2C%22removeAnimations%22%3Afalse%2C%
22createRecordPanelTitle%22%3Anull%7D%2C%22storable%22%3Atrue%7D%5D%7D
&aura.context=%7B%22mode%22%3A%22PROD%22%2C%22fwuid%22%3A%22D7zdsGvlxZ
fFP0e3F1H__2A%22%2C%22app%22%3A%22one%3Aone%22%2C%22loaded%22%3A%7B%22A
PPLICATION%40markup%3A%2F%2Fone%3Aone&22%3A%22QxH92NrKwFUqnsrKf8TjmQ%2
2%7D%2C%22dn%22%3A%5B%5D%2C%22globals%22%3A%7B%22density%22%3A%22VIEW__
TWO%22%2C%22appContextId%22%3A%2206m2w00000524wSAAQ%22%7D%2C%22uad%22%
3Atrue%7D&aura.pageURI=%2Flightning%2Fo%2FAccount&2Fnew%3Fcount&3D8%26
nooverride%3D1%26useRecordTypeCheck%3D1%26navigationLocation%3DLIST__VI
EW%26uid%3D167809698850161428%26backgroundContext%3D%252Flightning%252
Fo%252FAccount%252Flist%253FfilterName%253DRecent&aura.token=eyJub25jZ
SI6IkVVRGFvcFVmRXlVYU9zdmctQzFwSEFDajZaQ2M2ME1tTGNQSGVoa2VYZVlcdTAwM2Q
iLCJ0eXAiOiJKV1QiLCJhbGciOiJIUzI1NiIsImtpZCI6IntcInRcIjpcIjAwRDJ3MDAwM
DAwQ21VNlwiLFwidlwiOlwiMDJHMncwMDAwMDAwWXFYXCIsXCJhXCI6XCJjYWltYW5zaWd
uZXJcIn0iLCJjcml0IjpbImlhdCJdLCJpYXQiOjE2NzgwOTE5NDgxNzcsImV4cCI6MH0%3
D..xYMShbI__49V127bOk7ZVFkRq8wE__LpepEJDkk6npI4w%3D\""
        }
      },
      {
        "name": "customHeaders",
        "value": {
          "type": "LIST",
          "list": [
            {
              "type": "DICTIONARY",
              "dictionary": [
                {
                  "key": "enabled",
                  "value": {
                    "type": "BOOLEAN",
                    "boolean": "true"
                  }
                },
                {
                  "key": "name",
                  "value": {
                    "string": "Referer"
                  }
                },
                {
```

-continued

"key": "value",
"value": {
"string":
"https://ap16.lightning.force.com/lightning/o/Account/new?count=8&noov
erride=1&useRecordTypeCheck=1&navigationLocation=LIST__VIEW&uid=1678096
98850161428&backgroundContext=%2Flightning %2Fo%2FAccount%2Flist%3Ffilt
erName%3DRecent"
}
}
]
},
{
"type": "DICTIONARY"
"dictionary": [
{
"key": "enabled",
"value": {
"type": "BOOLEAN",
"boolean": "true"
}
},
{
"key": "name",
"value": {
"string": "User-
Agent"
}
},
{
"key": "value",
"value": {
"string":
"Mozilla/5.0 (Windows NT 10.0; Win64; x64) AppleWebKit/537.36 (KHTML,
like Gecko) Chrome/110.0.0.0 Safari/537.36"
}
}
]
},
{
"type": "DICTIONARY"
"dictionary": [
{
"key": "enabled",
"value": {
"type": "BOOLEAN",
"boolean": "true"
}
},
{
"key": "name",
"value": {
"string": "X-SFDC-
Page-Cache"
}
},
{
"key": "value",
"value": {
"string":
"cb892dc786013871"
}
}
]
},
{
"type": "DICTIONARY",
"dictionary": [
{
"key": "enabled"
"value": {
"type": "BOOLEAN",
"boolean": "true"
}
},
{

-continued

"key": "name",
"value": {
"string": "X-SFDC-
Request-Id"
}
},
{
"key": "value",
"value": {
"string":
"5040741500000e0ee5"
}
}
]
},
{
"type": "DICTIONARY",
"dictionary": [
{
"key": "enabled",
"value": {
"type": "BOOLEAN",
"boolean": "true"
}
},
{
"key": "name",
"value": {
"string": "sec-ch-ua"
}
},
{
"key": "value",
"value": {
"string":
"\"Chromium\";v=\"110\", \"Not A(Brand\";v=\"24\", \"Google
Chrome\";v=\"110\""
}
}
]
},
{
"type": "DICTIONARY",
"dictionary": [
{
"key": "enabled",
"value": {
"type": "BOOLEAN"
"boolean": "true"
}
},
{
"key": "name",
"value": {
"string": "sec-ch-ua-
mobile"
}
},
{
"key": "value",
"value": {
"string": "?0"
}
}
]
},
{
"type": "DICTIONARY",
"dictionary": [
{
"key": "enabled",
"value": {
"type": "BOOLEAN",
"boolean": "true"
}
},
{
"key": "name",
"value": {

-continued

```
                    “string”: “sec-ch-ua-
platform”
                  }
                },
                {
                  “key”: “value”,
                  “value”: {
                    “string”:
“\“Windows\””
                  }
                }
              ]
            }
          ]
        }
      },
      {
        “name”: “urlEncodedPostParameters”,
        “value”: {
          “type”: “LIST”
        }
      }
  ],
  “returnTo”: {
    “type”: “VARIABLE”,
    “variableName”: “Result”
  }
}
```

An exemplary variablized API Response (e.g., variablized API Response 766) following variablization of the exemplary converted API Response, such as for use by a particular RPA system, is a data file as follows.

Exemplary Variablized API Response

```
{
  “uid”: “11864.7141”,
  “packageName”: “Rest”,
  “ commandName”: “restPost”,
  “attributes”: [
    {
      “name”: “uriOption”,
      “value”: {
        “string”: “text”
      }
    },
    {
      “name”: “uri”,
      “value”: {
        “string”:
“https://ap16.lightning.force.com/aura?r=124&ui-force-components-
controllers-
createRecordTypeChecker.CreateRecordTypeChecker.doRecordTypeCheck=1”
      }
    },
    {
      “name”: “proxyType”,
      “value”: {
        “string”: “SYSTEM”
      }
    },
    {
      “name”: “authenticationMode”,
      “value”: {
        “string”: “NoAuthentication”
      }
    },
    {
      “name”: “allowInsecureConnection”,
      “value”: {
        “type”: “BOOLEAN”,
        “boolean”: “false”
      }
    },
```

-continued

```
{
  “name”: “timeOut”,
  “value”: {
    “type”: “NUMBER”,
    “number”: “60000”
  }
},
{
  “name”: “headerContentType”,
  “value”: {
    “string”: “application/x-www-form-urlencoded”
  }
},
{
  “name”: “allowInsecureConnection”,
  “value”: {
    “type”: “BOOLEAN”,
    “boolean”: “false”
  }
},
{
  “name”: “parameterOption”,
  “value”: {
    “string”: “text”
  }
},
{
  “name”: “customContentTypeBody”,
  “value”: {
    “string”:
“\“message=%7B%22actions%22%3A%5B%7B%22id%22%3A%223172%Ba%22%2C%22des
criptor%22%3A%22serviceComponent%3A%2F%2Fui.force.components.controlle
rs.createRecordTypeChecker.CreateRecordTypeCheckerController%2FACTION%
24doRecordTypeCheck%22%2C%22callingDescriptor%22%3A%22UNKNOWN%22%2C%22
params%22%3A%7B%22entityApiName%22%3A%22Account%22%2C%22defaultFieldVa
lues22%3Anull%2C%22navigationLocation%22%3A%22LIST__VIEW%22%2C%22navig
ationLocationId%22%3A%22Recent%22%2C%22removeAnimations%22%3Afalse%2C%
22createRecordPanelTitle%22%3Anull%7D%2C%22storable%22%3Atrue%7D%5D%7D
&aura.context=%7B%22mode%22%3A%22PROD%22%2C%22fwuid%22%3A%22D7zdsGvlxZ
fFP0e3F1H__2A%22%2C%22app%22%3A%22one%3Aone%22%2C%22loaded%22%3A%7B%22A
PPLICATION%40markup%3A%2F%2Fone%3Aone%22%3A%22QxH92NrKwFUqnsrKf8TjmQ%2
2%7D%2C%22dn%22%3A%5B%5D%2C%22globals%22%3A%7B%22density%22%3A%22VIEW__
TWO%22%2C%22appContextId%22%3A%2206m2w00000524wSAAQ%22%7D%2C%22uad%22%
3Atrue%7D&aura.pageURI=%2Flightning%2Fo%2FAccount%2Fnew%3Fcount%3D8%26
nooverride%3D1%26useRecordTypeCheck%3D1%26navigationLocation%3DLIST__VI
EW%26uid%3D16780969885016142 8%26backgroundContext%3D%252Flightning%252
Fo%252FAccount%252Flist%253FfilterName%253DRecent&aura.token=eyJub25jZ
SI6IkVVRGFvcFVmRXlVYU9zdmctQzFwSEFDajZaQ2M2ME1tTGNQSGVoa2VYZVlcdTAwM2Q
iLCJ0eXAiOiJKV1QiLCJhbGciOiJIUzI1NiIsImtpZCI6IntcInRcIjpcIjAwRDJ3MDAwM
DAwQ21VNlwiLFwidlwiOlwiMDJHMncwMDAwMDAWWXFYXCIsXCJhXCI6XCJjYWltYW5zaWd
uZXJcIn0iLCJjcml0IjpbImlhdCJdLCJpYXQiOjE2NzgwOTE5NDgxNzcsImV4cCI6MH0%3
D..xYMShbI__49V127bOk7ZVFkRq8wE__LpepEJDkk6npI4w%3D\””
  }
},
{
  “name”: “customHeaders”,
  “value”: {
    “type”: “LIST”,
    “list”: [
      {
        “type”: “DICTIONARY”,
        “dictionary”: [
          {
            “key”: “enabled”,
            “value”: {
              “type”: “BOOLEAN”,
              “boolean”: “true”
            }
          },
          {
            “key”: “name”,
            “value”: {
              “string”: “Referer”
            }
          },
          {
```

-continued

```
                    "key": "value",
                    "value": {
                        "expression":
"$Referer$"
                    }
                }
            ]
        },
        {
            "type": "DICTIONARY",
            "dictionary": [
                {
                    "key": "enabled",
                    "value": {
                        "type": "BOOLEAN",
                        "boolean": "true"
                    }
                },
                {
                    "key": "name",
                    "value": {
                        "string": "User-
Agent"
                    }
                },
                {
                    "key": "value",
                    "value": {
                        "expression": "$User-
Agent$"
                    }
                }
            ]
        },
        {
            "type": "DICTIONARY",
            "dictionary": [
                {
                    "key": "enabled",
                    "value": {
                        "type": "BOOLEAN",
                        "boolean": "true"
                    }
                },
                {
                    "key": "name",
                    "value": {
                        "string": "X-SFDC-
Page-Cache"
                    }
                },
                {
                    "key": "value",
                    "value": {
                        "expression": "$X-
SFDC-Page-Cache$"
                    }
                }
            ]
        },
        {
            "type": "DICTIONARY",
            "dictionary": [
                {
                    "key": "enabled",
                    "value": {
                        "type": "BOOLEAN"
                        "boolean": "true"
                    }
                },
                {
                    "key": "name",
                    "value": {
                        "string": "X-SFDC-
Request-Id"
                    }
                },
                {
```

-continued

```
                "key": "value",
                "value": {
                  "expression": "$X-
SFDC-Request-Id$"
                }
              }
            ]
          },
          {
            "type": "DICTIONARY",
            "dictionary": [
              {
                "key": "enabled",
                "value": {
                  "type": "BOOLEAN",
                  "boolean": "true"
                }
              },
              {
                "key": "name",
                "value": {
                  "string": "sec-ch-ua"
                }
              },
              {
                "key": "value",
                "value": {
                  "expression": "$sec-
ch-ua$"
                }
              }
            ]
          },
          {
            "type": "DICTIONARY",
            "dictionary": [
              {
                "key": "enabled",
                "value": {
                  "type": "BOOLEAN",
                  "boolean": "true"
                }
              },
              {
                "key": "name",
                "value": {
                  "string": "sec-ch-ua-
mobile"
                }
              },
              {
                "key": "value",
                "value": {
                  "expression": "$sec-
ch-ua-mobile$"
                }
              }
            ]
          },
          {
            "type": "DICTIONARY",
            "dictionary": [
              {
                "key": "enabled",
                "value": {
                  "type": "BOOLEAN",
                  "boolean": "true"
                }
              },
              {
                "key": "name",
                "value": {
                  "string": "sec-ch-ua-
platform"
                }
              },
              {
```

-continued

```
                    "key": "value",
                    "value": {
                      "expression": "$sec-
ch-ua-platform$"
                    }
                  }
                ]
              }
            ]
          }
        },
        {
          "name": "urlEncodedPostParameters",
          "value": {
            "type": "LIST"
          }
        }
      ],
      "returnTo": {
        "type": "VARIABLE",
        "variableName": "Result"
      }
    }
```

As an example, in the exemplary variablized API response, variables were substituted for various fixed values (e.g., API parameters) in the exemplary converted API response. As examples, various string values for key-value pairs in the exemplary converted API response were replaced by the following variables: $Referer$, $User-Agent$, $User-Agent$, $FDC-Page-Cache$, $FDC-Request-Id$, $sec-ch-ua$, $sec-ch-ua-mobile$, and $sec-ch-ua-platform$. In one implementation, in creating one or more corresponding variables, naming of the corresponding variable can be based on a predetermined naming convention, such as the naming being programmatically determined at least in part by a portion of the data associated to the corresponding variable. Additionally or alternatively, the initial values assigned to the various variables can be the corresponding captured value or can be default values that can be based on the corresponding captured value, which can be done, for example, by inserting appropriate assign actions for each of such variable.

In one embodiment, the various API responses can be provided in a JSON format. For example, the exemplary Step Response, exemplary converted Step Response, exemplary API Response, exemplary converted API response, and exemplary variablized API response noted have a JSON format. Those skilled in the art will recognize that these various files need not have a JSON format, and need not all have the same format.

The various aspects disclosed herein can be utilized with or by robotic process automation systems. Exemplary robotic process automation systems and operations thereof are detailed below.

Figure 8:
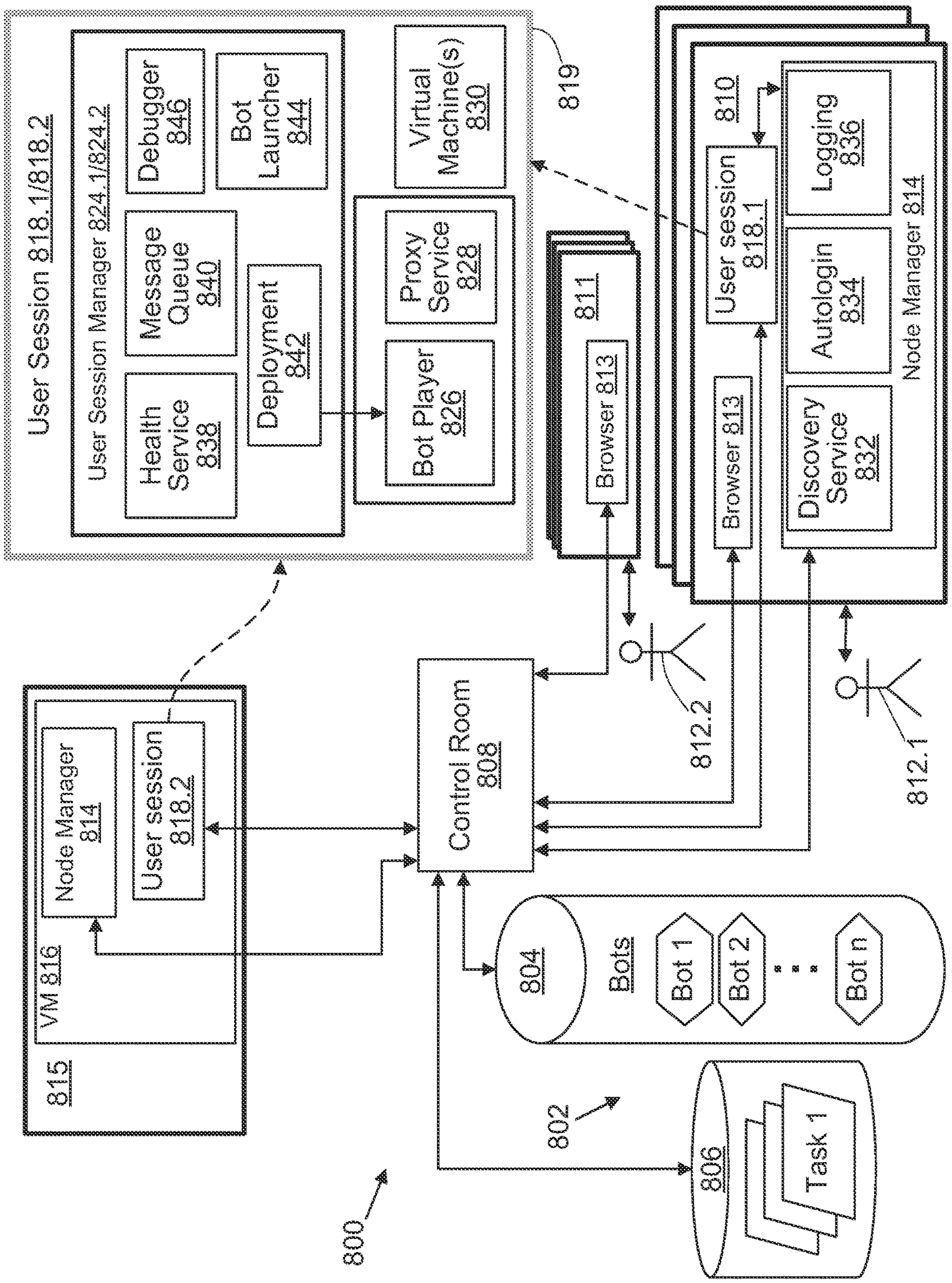
FIG. 8 is a block diagram of a robotic process automation system according to one embodiment.

FIG. 8 is a block diagram of a robotic process automation (RPA) system 800 according to one embodiment. The RPA system 800 includes data storage 802. The data storage 802 can store a plurality of software robots 804, also referred to as bots (e.g., Bot 1, Bot 2, . . . , Bot n). The software robots 804 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 826), on which a bot will execute or is executing. The data storage 802 can also store a plurality of work items 806. Each work item 806 can pertain to processing executed by one or more of the software robots 804.

The RPA system 800 can also include a control room 808. The control room 808 is operatively coupled to the data storage 802 and is configured to execute instructions that, when executed, cause the RPA system 800 to respond to a request from a client device 810 that is issued by a user 812.1. The control room 808 can act as a server to provide to the client device 810 the capability to perform an automation task to process a work item from the plurality of work items 806. The RPA system 800 is able to support multiple client devices 810 concurrently, each of which will have one or more corresponding user session(s) 818, which provides a context. The context can, for example, include security, permissions, audit trails, etc. to define the permissions and roles for bots operating under the user session 818. For example, a bot executing under a user session, cannot access any files or use any applications that the user, under whose credentials the bot is operating, does not have permission to do so. This prevents any inadvertent or malicious acts from a bot under which bot 804 executes.

The control room 808 can provide, to the client device 810, software code to implement a node manager 814. The node manager 814 executes on the client device 810 and provides a user 812 a visual interface via browser 813 to view progress of and to control execution of automation tasks. It should be noted that the node manager 814 can be provided to the client device 810 on demand, when required by the client device 810, to execute a desired automation task. In one embodiment, the node manager 814 may remain on the client device 810 after completion of the requested automation task to avoid the need to download it again. In another embodiment, the node manager 814 may be deleted from the client device 810 after completion of the requested automation task. The node manager 814 can also maintain a connection to the control room 808 to inform the control room 808 that device 810 is available for service by the control room 808, irrespective of whether a live user session 818 exists. When executing a bot 804, the node manager 814 can impersonate the user 812 by employing credentials associated with the user 812.

The control room 808 initiates, on the client device 810, a user session 818 (seen as a specific instantiation 818.1) to perform the automation task. The control room 808 retrieves the set of task processing instructions 804 that correspond to the work item 806. The task processing instructions 804 that correspond to the work item 806 can execute under control of the user session 818.1, on the client device 810. The node manager 814 can provide update data indicative of status of processing of the work item to the control room 808. The control room 808 can terminate the user session 818.1 upon completion of processing of the work item 806. The user session 818.1 is shown in further detail at 819, where an instance 824.1 of user session manager 824 is seen along with a bot player 826, proxy service 828, and one or more virtual machine(s) 830, such as a virtual machine that runs Java® or Python®. The user session manager 824 provides a generic user session context within which a bot 804 executes.

The bots 804 execute on a player, via a computing device, to perform the functions encoded by the bot. Some or all of the bots 804 may in certain embodiments be located remotely from the control room 808. Moreover, the devices 810 and 811, which may be conventional computing devices, such as for example, personal computers, server computers, laptops, tablets and other portable computing devices, may also be located remotely from the control room 808. The devices 810 and 811 may also take the form of virtual computing devices. The bots 804 and the work items 806 are shown in separate containers for purposes of illustration but they may be stored in separate or the same device(s), or across multiple devices. The control room 808 can perform user management functions, source control of the bots 804, along with providing a dashboard that provides analytics and results of the bots 804, performs license management of software required by the bots 804 and manages overall execution and management of scripts, clients, roles, credentials, security, etc. The major functions performed by the control room 808 can include: (i) a dashboard that provides a summary of registered/active users, tasks status, repository details, number of clients connected, number of scripts passed or failed recently, tasks that are scheduled to be executed and those that are in progress; (ii) user/role management-permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 808 is shown generally for simplicity of explanation. Multiple instances of the control room 808 may be employed where large numbers of bots are deployed to provide for scalability of the RPA system 800.

In the event that a device, such as device 811 (e.g., operated by user 812.2) does not satisfy the minimum processing capability to run a node manager 814, the control room 808 can make use of another device, such as device 815, that has the requisite capability. In such case, a node manager 814 within a Virtual Machine (VM), seen as VM 816, can be resident on the device 815. The node manager 814 operating on the device 815 can communicate with browser 813 on device 811. This approach permits RPA system 800 to operate with devices that may have lower processing capability, such as older laptops, desktops, and portable/mobile devices such as tablets and mobile phones. In certain embodiments the browser 813 may take the form of a mobile application stored on the device 811. The control room 808 can establish a user session 818.2 for the user 812.2 while interacting with the control room 808 and the corresponding user session 818.2 operates as described above for user session 818.1 with user session manager 824 operating on device 810 as discussed above.

In certain embodiments, the user session manager 824 can provide one or more of five functions. First is a health service 838 that maintains and provides a detailed logging of bot execution including monitoring memory and CPU usage by the bot and other parameters such as number of file handles employed. The bots 804 can employ the health service 838 as a resource to pass logging information to the control room 808. Execution of the bot is separately monitored by the user session manager 824 to track memory, CPU, and other system information. The second function provided by the user session manager 824 is a message queue 840 for exchange of data between bots executed within the same user session 818. The third function is a deployment service (also referred to as a deployment module) 842 that connects to the control room 808 to request execution of a requested bot 804. The deployment service 842 can also ensure that the environment is ready for bot execution, such as by making available dependent libraries. The fourth function is a bot launcher 844 which can read metadata associated with a requested bot 804 and launch an appropriate container and begin execution of the requested bot. The fifth function is a debugger service 846 that can be used to debug bot code.

The bot player 826 can execute, or play back, a sequence of instructions encoded in a bot. The sequence of instructions can, for example, be captured by way of a recorder when a human performs those actions, or alternatively the instructions are explicitly coded into the bot. These instructions enable the bot player 826, to perform the same actions as a human would do in their absence. In one implementation, the instructions can compose of a command (action) followed by set of parameters, for example: Open Browser is a command, and a URL would be the parameter for it to launch a web resource. Proxy service 828 can enable integration of external software or applications with the bot to provide specialized services. For example, an externally hosted artificial intelligence system could enable the bot to understand the meaning of a "sentence."

The user 812.1 can interact with node manager 814 via a conventional browser 813 which employs the node manager 814 to communicate with the control room 808. When the user 812.1 logs in from the client device 810 to the control room 808 for the first time, the user 812.1 can be prompted to download and install the node manager 814 on the device 810, if one is not already present. The node manager 814 can establish a web socket connection to the user session manager 824, deployed by the control room 808 that lets the user 812.1 subsequently create, edit, and deploy the bots 804.

Figure 9:
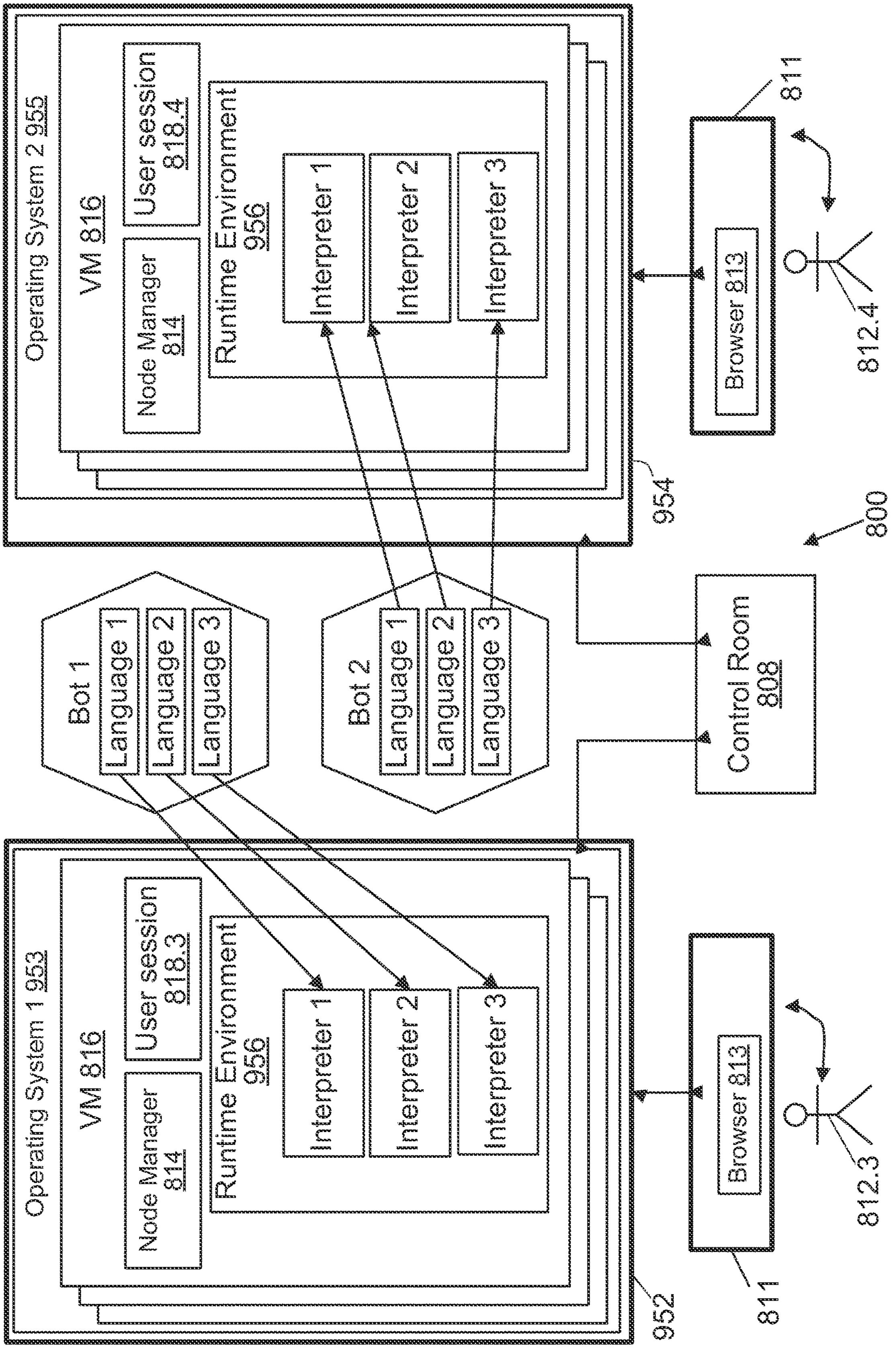
FIG. 9 is a block diagram of a generalized runtime environment for bots in accordance with another embodiment of the robotic process automation system illustrated in FIG. 8.

FIG. 9 is a block diagram of a generalized runtime environment for bots 804 in accordance with another embodiment of the RPA system 800 illustrated in FIG. 8. This flexible runtime environment advantageously permits extensibility of the platform to enable use of various languages in encoding bots. In the embodiment of FIG. 9, RPA system 800 generally operates in the manner described in connection with FIG. 8, except that in the embodiment of FIG. 9, some or all of the user sessions 818 execute within a virtual machine 816. This permits the bots 804 to operate on an RPA system 800 that runs on an operating system different from an operating system on which a bot 804 may have been developed. For example, if a bot 804 is developed on the Windows® operating system, the platform agnostic embodiment shown in FIG. 9 permits the bot 804 to be executed on a device 952 or 954 executing an operating system 953 or 955 different than Windows®, such as, for example, Linux. In one embodiment, the VM 816 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 9, multiple devices 952 can execute operating system 1, 953, which may, for example, be a Windows® operating system. Multiple devices 954 can execute operating system 2, 955, which may, for example, be a Linux® operating system. For simplicity of explanation, two different operating systems are shown, by way of example and additional operating systems such as the macOS®, or other operating systems may also be employed on devices 952, 954 or other devices. Each device 952, 954 has installed therein one or more VM's 816, each of which can execute its own operating system (not shown), which may be the same or different than the host operating system 953/955. Each VM 816 has installed, either in advance, or on demand from control room 808, a node manager 814. The embodiment illustrated in FIG. 9 differs from the embodiment shown in FIG. 8 in that the devices 952 and 954 have installed thereon one or more VMs 816 as described above, with each VM 816 having an operating system installed that may or may not be compatible with an operating system required by an automation task. Moreover, each VM has installed thereon a runtime environment 956, each of which has installed thereon one or more interpreters (shown as interpreter 1, interpreter 2, interpreter 3). Three interpreters are shown by way of example but any run time environment 956 may, at any given time, have installed thereupon less than or more than three different interpreters. Each interpreter 956 is specifically encoded to interpret instructions encoded in a particular programming language. For example, interpreter 1 may be encoded to interpret software programs encoded in the Java® programming language, seen in FIG. 9 as language 1 in Bot 1 and Bot 2. Interpreter 2 may be encoded to interpret software programs encoded in the Python® programming language, seen in FIG. 9 as language 2 in Bot 1 and Bot 2, and interpreter 3 may be encoded to interpret software programs encoded in the R programming language, seen in FIG. 9 as language 3 in Bot 1 and Bot 2.

Turning to the bots Bot 1 and Bot 2, each bot may contain instructions encoded in one or more programming languages. In the example shown in FIG. 9, each bot can contain instructions in three different programming languages, for example, Java®, Python® and R. This is for purposes of explanation and the embodiment of FIG. 9 may be able to create and execute bots encoded in more or less than three programming languages. The VMs 816 and the runtime environments 956 permit execution of bots encoded in multiple languages, thereby permitting greater flexibility in encoding bots. Moreover, the VMs 816 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 808 will select a device with a VM 816 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 10:
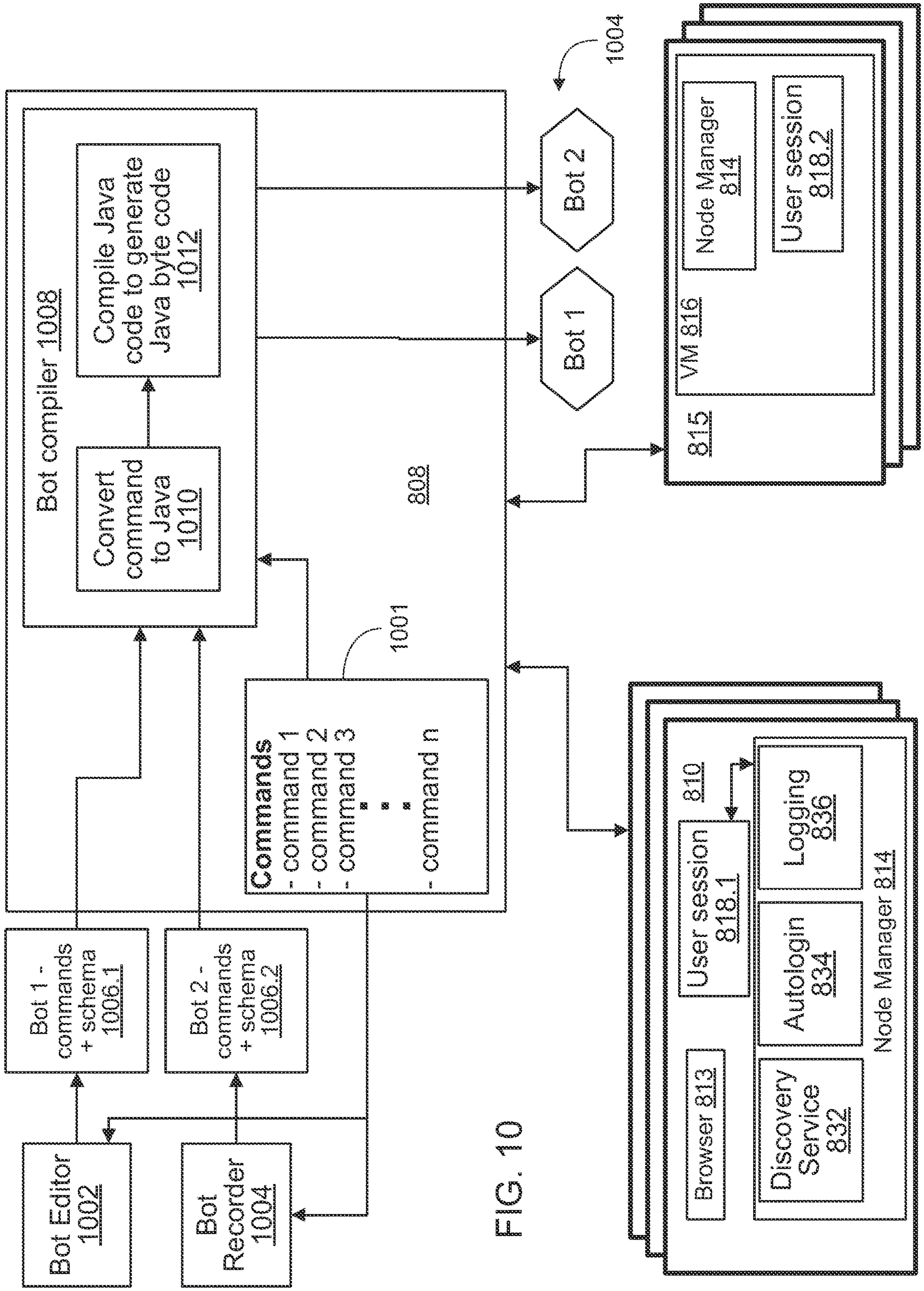
FIG. 10 is yet another embodiment of the robotic process automation system of FIG. 8 configured to provide platform independent sets of task processing instructions for bots.

FIG. 10 illustrates a block diagram of yet another embodiment of the RPA system 800 of FIG. 8 configured to provide platform independent sets of task processing instructions for bots 804. Two bots 804, bot 1 and bot 2 are shown in FIG. 10. Each of bots 1 and 2 are formed from one or more commands 1001, each of which specifies a user level operation with a specified application program, or a user level operation provided by an operating system. Sets of commands 1006.1 and 1006.2 may be generated by bot editor 1002 and bot recorder 1004, respectively, to define sequences of application-level operations that are normally performed by a human user. The bot editor 1002 may be configured to combine sequences of commands 1001 via an editor. The bot recorder 1004 may be configured to record application-level operations performed by a user and to convert the operations performed by the user to commands 1001. The sets of commands 1006.1 and 1006.2 generated by the editor 1002 and the recorder 1004 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 808 operates to compile, via compiler 1008, the sets of commands generated by the editor 1002 or the recorder 1004 into platform independent executables, each of which is also referred to herein as a bot JAR (Java ARchive) that perform application-level operations captured by the bot editor 1002 and the bot recorder 1004. In the embodiment illustrated in FIG. 10, the set of commands 1006, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 810 and/or 815 to perform the encoded application-level operations that are normally performed by a human user.

Figure 11:
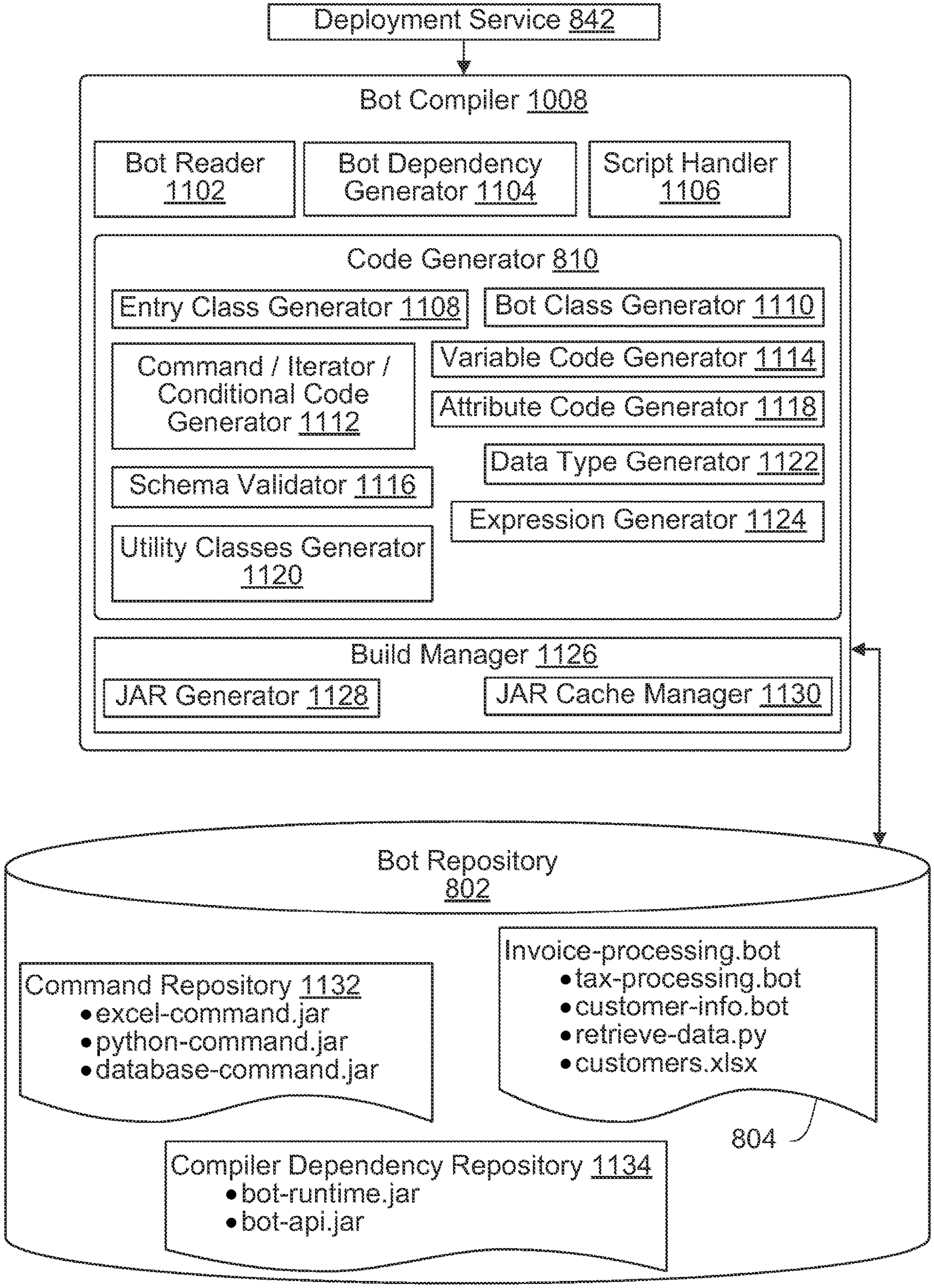
FIG. 11 is a block diagram illustrating details of one embodiment of the bot compiler illustrated in FIG. 10.

FIG. 11 is a block diagram illustrating details of one embodiment of the bot compiler 1008 illustrated in FIG. 10. The bot compiler 1008 accesses one or more of the bots 804 from the data storage 802, which can serve as bot repository, along with commands 1001 that are contained in a command repository 1132. The bot compiler 1008 can also access compiler dependency repository 1134. The bot compiler 1008 can operate to convert each command 1001 via code generator module 1010 to an operating system independent format, such as a Java command. The bot compiler 1008 then compiles each operating system independent format command into byte code, such as Java byte code, to create a bot JAR. The convert command to Java module 1010 is shown in further detail in in FIG. 11 by JAR generator 1128 of a build manager 1126. The compiling to generate Java byte code module 1012 can be provided by the JAR generator 1128. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 10, deployment service 842 can be responsible to trigger the process of bot compilation and then once a bot has compiled successfully, to execute the resulting bot JAR on selected devices 810 and/or 815. The bot compiler 1008 can comprises a number of functional modules that, when combined, generate a bot 804 in a JAR format. A bot reader 1102 loads a bot file into memory with class representation. The bot reader 1102 takes as input a bot file and generates an in-memory bot structure. A bot dependency generator 1104 identifies and creates a dependency graph for a given bot. It includes any child bot, resource file like script, and document or image used while creating a bot. The bot dependency generator 1104 takes, as input, the output of the bot reader 1102 and provides, as output, a list of direct and transitive bot dependencies. A script handler 1106 handles script execution by injecting a contract into a user script file. The script handler 1106 registers an external script in manifest and bundles the script as a resource in an output JAR. The script handler 1106 takes, as input, the output of the bot reader 1102 and provides, as output, a list of function pointers to execute different types of identified scripts like Python, Java, VB scripts.

An entry class generator 1108 can create a Java class with an entry method, to permit bot execution to be started from that point. For example, the entry class generator 1108 takes, as an input, a parent bot name, such "Invoice-processing.bot" and generates a Java class having a contract method with a predefined signature. A bot class generator 1110 can generate a bot class and orders command code in sequence of execution. The bot class generator 1110 can take, as input, an in-memory bot structure and generates, as output, a Java class in a predefined structure. A Command/Iterator/Conditional Code Generator 1112 wires up a command class with singleton object creation, manages nested command linking, iterator (loop) generation, and conditional (If/Else If/Else) construct generation. The Command/Iterator/Conditional Code Generator 1112 can take, as input, an in-memory bot structure in JSON format and generates Java code within the bot class. A variable code generator 1114 generates code for user defined variables in the bot, maps bot level data types to Java language compatible types, and assigns initial values provided by user. The variable code generator 1114 takes, as input, an in-memory bot structure and generates Java code within the bot class. A schema validator 1116 can validate user inputs based on command schema and includes syntax and semantic checks on user provided values. The schema validator 1116 can take, as input, an in-memory bot structure and generates validation errors that it detects. The attribute code generator 1118 can generate attribute code, handles the nested nature of attributes, and transforms bot value types to Java language compatible types. The attribute code generator 1118 takes, as input, an in-memory bot structure and generates Java code within the bot class. A utility classes generator 1120 can generate utility classes which are used by an entry class or bot class methods. The utility classes generator 1120 can generate, as output, Java classes. A data type generator 1122 can generate value types useful at runtime. The data type generator 1122 can generate, as output, Java classes. An expression generator 1124 can evaluate user inputs and generates compatible Java code, identifies complex variable mixed user inputs, inject variable values, and transform mathematical expressions. The expression generator 1124 can take, as input, user defined values and generates, as output, Java compatible expressions.

The JAR generator 1128 can compile Java source files, produces byte code and packs everything in a single JAR, including other child bots and file dependencies. The JAR generator 1128 can take, as input, generated Java files, resource files used during the bot creation, bot compiler dependencies, and command packages, and then can generate a JAR artifact as an output. The JAR cache manager 1130 can put a bot JAR in cache repository so that recompilation can be avoided if the bot has not been modified since the last cache entry. The JAR cache manager 1130 can take, as input, a bot JAR.

In one or more embodiment described herein command action logic can be implemented by commands 1001 available at the control room 808. This permits the execution environment on a device 810 and/or 815, such as exists in a user session 818, to be agnostic to changes in the command action logic implemented by a bot 804. In other words, the manner in which a command implemented by a bot 804 operates need not be visible to the execution environment in which a bot 804 operates. The execution environment is able to be independent of the command action logic of any commands implemented by bots 804. The result is that changes in any commands 1001 supported by the RPA system 800, or addition of new commands 1001 to the RPA system 800, do not require an update of the execution environment on devices 810, 815. This avoids what can be a time and resource intensive process in which addition of a new command 1001 or change to any command 1001 requires an update to the execution environment to each device 810, 815 employed in an RPA system. Take, for example, a bot that employs a command 1001 that logs into an on-online service. The command 1001 upon execution takes a Uniform Resource Locator (URL), opens (or selects) a browser, retrieves credentials corresponding to a user on behalf of whom the bot is logging in as, and enters the user credentials (e.g., username and password) as specified. If the command 1001 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 12:
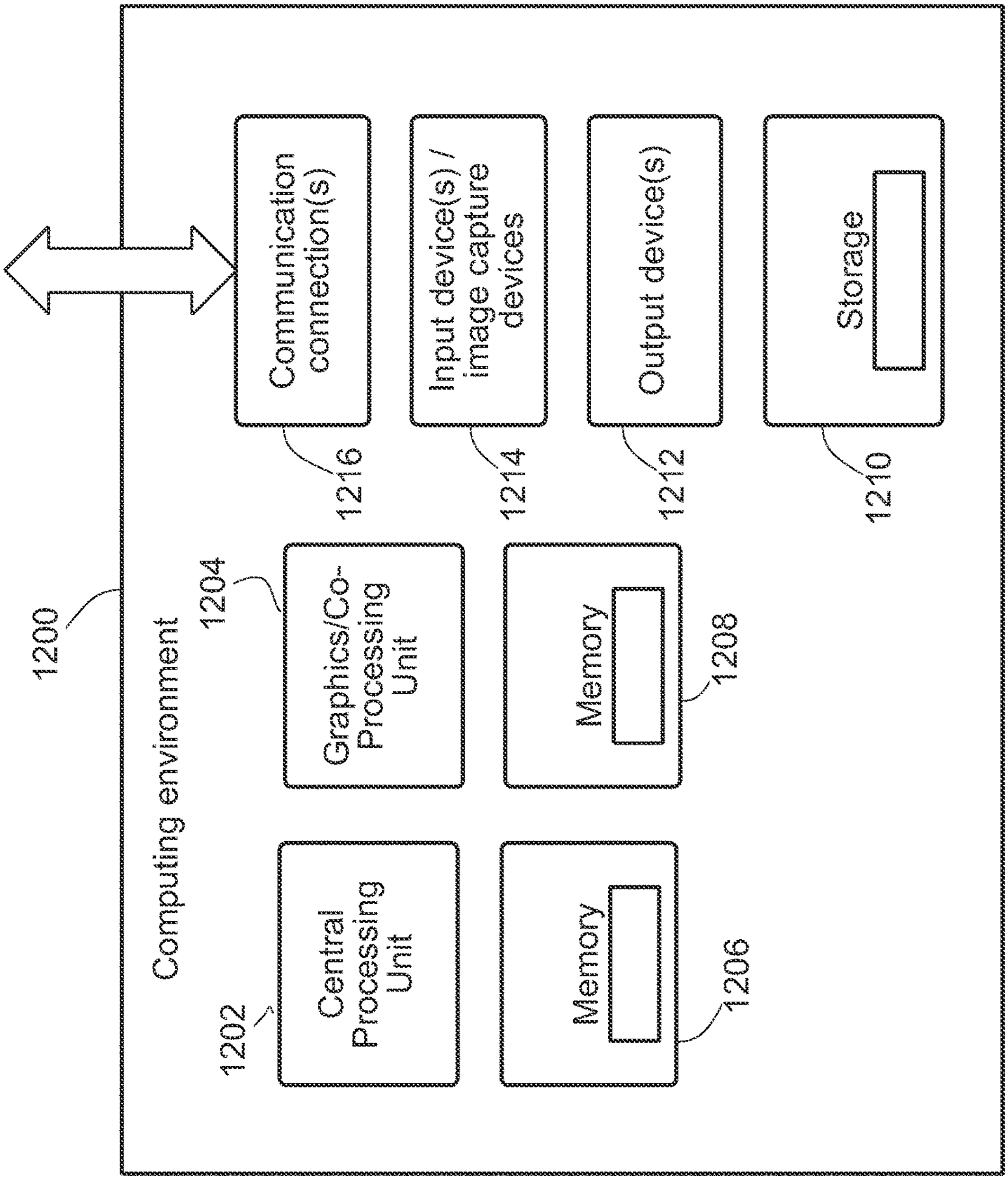
FIG. 12 is a block diagram of an exemplary computing environment for an implementation of a robotic process automation system.

FIG. 12 illustrates a block diagram of an exemplary computing environment 1200 for an implementation of an RPA system, such as the RPA systems disclosed herein. The embodiments described herein may be implemented using the exemplary computing environment 1200. The exemplary computing environment 1200 includes one or more processing units 1202, 1204 and memory 1206, 1208. The processing units 1202, 1206 execute computer-executable instructions. Each of the processing units 1202, 1206 can be a general-purpose central processing unit (CPU), processor in an application-specific integrated circuit (ASIC) or any other type of processor. For example, as shown in FIG. 12, the processing unit 1202 can be a CPU, and the processing unit can be a graphics/co-processing unit (GPU). The tangible memory 1206, 1208 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1200 may be rearranged in various embodiments, and some embodiments may not require nor include all of the above components, while other embodiments may include additional components, such as specialized processors and additional memory.

The exemplary computing environment 1200 may have additional features such as, for example, tangible storage 1210, one or more input devices 1214, one or more output devices 1212, and one or more communication connections 1216. An interconnection mechanism (not shown) such as a bus, controller, or network can interconnect the various components of the exemplary computing environment 1200. Typically, operating system software (not shown) provides an operating system for other software executing in the exemplary computing environment 1200, and coordinates activities of the various components of the exemplary computing environment 1200.

The tangible storage 1210 may be removable or non-removable, and includes magnetic disks, magnetic tapes or cassettes, CD-ROMs, DVDs, or any other medium which can be used to store information in a non-transitory way, and which can be accessed within the computing system 1200. The tangible storage 1210 can store instructions for the software implementing one or more features of a PRA system as described herein.

The input device(s) or image capture device(s) 1214 may include, for example, one or more of a touch input device (such as a keyboard, mouse, pen, or trackball), a voice input device, a scanning device, an imaging sensor, touch surface, or any other device capable of providing input to the exemplary computing environment 1200. For multimedia embodiment, the input device(s) 1214 can, for example, include a camera, a video card, a TV tuner card, or similar device that accepts video input in analog or digital form, a microphone, an audio card, or a CD-ROM or CD-RW that reads audio/video samples into the exemplary computing environment 1200. The output device(s) 1212 can, for example, include a display, a printer, a speaker, a CD-writer, or any another device that provides output from the exemplary computing environment 1200.

The one or more communication connections 1216 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for creating a software automation process, comprising:

initiating a recorder configured to capture a sequence of interactions with one or more application programs operating on at least one user computing device and/or with one or more network-accessible resources operating on at least one remote computing device;

recording, via the recorder, (i) user interactions with the one or more application programs operating on the at least one user computing device, and (ii) Application Programming Interface (API) interactions with the one or more network-accessible resources operating on at least one remote computing device; and creating the software automation process in accordance with the recording, wherein creating the software automation process includes converting at least one fixed data value captured in the recording of the API interactions into a variable of the software automation process, the created software automation process including at least programmatic initiation of the user interactions and programmatic initiation of the API interactions, wherein the programmatic initiation of the API interactions includes the software automation process determining, during execution of the software automation process, a run-time data value and assigning the run-time data value to the variable.

2. A method as recited in claim 1, wherein the method comprises:

associating each of the API interactions with a corresponding one or more of the user interactions.

3. A method as recited in claim 2, wherein the method comprises:

presenting a graphic user interface representing the created software robot, the graphical user interface visually depicting the API interactions in association with the corresponding one or more of the user interactions.

4. A method as recited in claim 2, wherein the method comprises:

presenting a graphic user interface representing the created software robot, the graphical user interface including at least a listing of variables used by the API interactions.

5. A method as recited in claim 2, wherein the method comprises:

presenting a graphic user interface representing the created software robot, the graphical user interface including at least a listing of variables used by the API interactions, and the graphical user interface visually depicting the API interactions in association with the corresponding one or more of the user interactions.

6. A method as recited in claim 1, wherein the programmatic initiation of the API interactions initiates API calls.

7. A method as recited in claim 1, wherein each of the API interactions includes an API request having a HTTP header, and wherein the method comprises:

processing each of the API interactions to obtain API request data from the HTTP header associated therewith.

8. A method as recited in claim 7, wherein the HTTP header includes properties of the API request, and each of the properties has a value, and wherein the method comprises:

converting the values of the properties into variables.

9. A method as recited in claim 1, wherein each of the API interactions includes one or more parameters for the associated API request, and wherein the method comprises:

processing each of the API interactions to identify the one or more parameters for the associated API request;

converting values for the identified one or more parameters into variables.

10. A method as recited in claim 9, wherein the created software automation process is configured to initiate a subsequent API request using at least a portion of the API information within the recording while also providing data values for the variables for the identified one or more parameters for the subsequent API request.

11. A computer-implemented method for creating a software automation process, comprising:

initiating capture of user actions with one or more application programs operating on at least one user computing device;

initiating capture of Application Programming Interface (API) actions with one or more network-accessible resources operating on at least one remote computing device;

determining whether a user action with the one or more application programs has been detected;

recording user information descriptive of the detected user action when the determining determines that the user action with the one or more application programs has been detected;

determining whether an API call action with the one or more network-accessible resources has been detected;

recording API call information descriptive of the detected API call action when the determining determines that the API call action with the one or more network-accessible resources has been detected;

determining whether to stop the capture of the user actions and the API actions;

ending the capture of user actions with the one or more application programs operating on the at least one user computing device after the determining determines that the capture of the user actions should stop;

ending the capture of API actions with the one or more network-accessible resources operating on the at least one remote computing device after the determining determines that the capture of the API actions should stop; and creating the software automation process in accordance with the user information that has been recorded and the API call information that has been recorded, wherein creating the software automation process includes converting at least one fixed data value captured in the API call information into a variable of the software automation process, the created software automation process being configured to provide programmatic initiation of user actions to mimic the user actions that have been captured and to provide programmatic initiation of API actions to mimic the API call actions that have been captured, wherein the programmatic initiation of API actions includes the software automation process determining, during execution of the software automation process, a run-time data value and assigning the run-time data value to the variable.

12. A computer-implemented method as recited in claim 11, wherein the detected API call action includes a HTTP header, wherein the method comprises:

processing the detected API call action to obtain API request data from the HTTP header associated therewith, and wherein the API call information being recorded includes at least a portion of the API request data obtained from the HTTP header.

13. A computer-implemented method as recited in claim 11, wherein the method comprises:

associating each of a plurality of the detected API call actions with a corresponding one of the detected user interactions.

14. A computer-implemented method as recited in claim 13, wherein the method comprises:

presenting a graphic user interface representing the created software automation process, the graphical user interface including at least a listing of variables used by at least one of the plurality of the detected API call actions, and the graphical user interface visually depicting the at least one of the plurality of the detected API call actions in association with the corresponding one or more of the detected interactions.

15. A computer-implemented method as recited in claim 11, wherein the programmatic initiation of the API actions by the created software automation process initiates API calls.

16. A non-transitory computer readable medium including at least computer program code tangible stored therein for creating a software automation process, the computer readable medium comprising:

computer program code for initiating a recorder configured to capture a sequence of interactions with one or more application programs operating on at least one user computing device and/or with one or more network-accessible resources operating on at least one remote computing device;

computer program code for recording, via the recorder, (i) user interactions with the one or more application programs operating on the at least one user computing device, and (ii) Application Programming Interface (API) interactions with the one or more network-accessible resources operating on at least one remote computing device; and computer program code for creating the software automation process in accordance with the recording, wherein creating the software automation process includes converting at least one fixed data value captured in the recording of the API interactions into a variable of the software automation process, the created software automation process including at least programmatic initiation of the user interactions and programmatic initiation of the API interactions, wherein the programmatic initiation of the API interactions includes the software automation process determining, during execution of the software automation process, a run-time data value and assigning the run-time data value to the variable.

17. A non-transitory computer readable medium as recited in claim 16, wherein the computer readable medium comprises:

Computer program code for associating each of the API interactions with a corresponding one or more of the user interactions.

18. A non-transitory computer readable medium including at least computer program code tangible stored therein for facilitating creation of a software automation process, the computer readable medium comprising:

computer program code for initiating capture of user actions with one or more application programs operating on at least one user computing device;

computer program code for initiating capture of Application Programming Interface (API) actions with one or more network-accessible resources operating on at least one remote computing device;

computer program code for determining whether a user action with the one or more application programs has been detected;

computer program code for recording user information descriptive of the detected user action when the determining determines that the user action with the one or more application programs has been detected;

computer program code for determining whether an API call action with the one or more network-accessible resources has been detected;

computer program code for recording API call information descriptive of the detected API call action when the determining determines that the API call action with the one or more network-accessible resources has been detected;

computer program code for determining whether to stop the capture of the user actions and the API actions;

computer program code for ending the capture of user actions with the one or more application programs operating on the at least one user computing device after the determining determines that the capture of the user actions should stop; and computer program code for ending the capture of API actions with the one or more network-accessible resources operating on the at least one remote computing device after the determining determines that the capture of the API actions should stop; and computer program code for creating the software automation process in accordance with the user information that has been recorded and the API call information that has been recorded, wherein creating the software automation process includes converting at least one fixed data value captured in the API call information into a variable of the software automation process, the created software automation process being configured to provide programmatic initiation of user actions to mimic the user actions that have been captured and to provide programmatic initiation of API actions to mimic the API call actions that have been captured, wherein the programmatic initiation of API actions includes the software automation process determining, during execution of the software automation process, a run-time data value and assigning the run-time data value to the variable.

19. A non-transitory computer readable medium as recited in claim 18, wherein the computer readable medium comprises:

computer program code for creating a software automation process in accordance with the user information that has been recorded and the API call information that has been recorded, the created software automation process being configured to provide programmatic initiation of user actions to mimic the user actions that have been captured and to provide programmatic initiation of API actions to mimic the API call actions that have been captured.

20. A non-transitory computer readable medium as recited in claim 19, wherein the computer readable medium comprises:

computer program code for associating each of a plurality of the detected API call actions with a corresponding one of the detected user interactions;

computer program code for presenting a graphic user interface representing the created software automation process, the graphical user interface including at least a listing of variables used by at least one of the plurality of the detected API call actions, and the graphical user interface visually depicting the at least one of the plurality of the detected API call actions in association with the corresponding one or more of the detected interactions.

* * * * *